(12) United States Patent
Ben-Ishay et al.

(10) Patent No.: US 11,113,447 B2
(45) Date of Patent: Sep. 7, 2021

(54) CROSS-APPLICATION INGESTION AND RESTRUCTURING OF SLIDE PRESENTATION CONTENT

(71) Applicant: Microsoft Technology Licensing, LLC, Redmond, WA (US)

(72) Inventors: Ron Ben-Ishay, Herzliya (IL); Oren Gordon, Tel Aviv (IL); Tal Bouhadana, Tel Aviv (IL); Lior Zilberstein, Tel Aviv (IL); Daniel Hoter, Jerusalem (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 16/052,376

(22) Filed: Aug. 1, 2018

(65) Prior Publication Data

US 2020/0042575 A1 Feb. 6, 2020

(51) Int. Cl.
*G06F 17/00* (2019.01)
*G06F 40/103* (2020.01)
*G06F 40/20* (2020.01)

(52) U.S. Cl.
CPC ............ *G06F 40/103* (2020.01); *G06F 40/20* (2020.01)

(58) Field of Classification Search
CPC .... G06F 40/106; G06F 40/166; G06F 40/103; G06F 16/957; G06F 16/5846; G06F 40/20; G06T 11/60
See application file for complete search history.

(56) References Cited

U.S. PATENT DOCUMENTS

| 5,634,124 | A  | 5/1997  | Khoyi et al. |
| 5,701,400 | A  | 12/1997 | Amado |
| 6,292,842 | B1 | 9/2001  | Crouch et al. |
| 6,718,336 | B1 | 4/2004  | Saffer et al. |
| 7,373,603 | B1 | 5/2008  | Yalovsky et al. |
| 7,506,243 | B2 | 3/2009  | Kotler et al. |
| 8,112,713 | B2 | 2/2012  | Zuber |
| 8,230,332 | B2 | 7/2012  | Summers et al. |
| 8,799,251 | B2 | 8/2014  | McCormack et al. |

(Continued)

FOREIGN PATENT DOCUMENTS

| WO | 2001095088 A1 | 12/2001 |
| WO | 2015113301 A1 | 8/2015 |

OTHER PUBLICATIONS

"Non-Final Office Action Issued in U.S. Appl. No. 16/052,372", dated Jan. 3, 2020, 17 Pages.

(Continued)

*Primary Examiner* — Scott T Baderman
*Assistant Examiner* — Barbara M Level
(74) *Attorney, Agent, or Firm* — Christopher J. Volkmann; Kelly, Holt & Christensen, PLLC

(57) ABSTRACT

A content generation computing system includes content generating application logic. The content generating application logic runs a content generation application to generate content. It also includes content ingestion and transformation logic that allows a user to identify slide presentation content from a source document for ingestion into a document that is being generated. The system automatically restructures graphical objects in the ingested slide presentation content based upon the content generation application into which it is being ingested.

16 Claims, 19 Drawing Sheets

(56) References Cited

U.S. PATENT DOCUMENTS

| | | | |
|---|---|---|---|
| 8,839,251 | B2 | 9/2014 | Dolph et al. |
| 8,904,269 | B2* | 12/2014 | Antley .................. G06F 40/166 |
| | | | 715/202 |
| 8,966,361 | B2 | 2/2015 | Lee |
| 9,256,583 | B2 | 2/2016 | Caten |
| 9,262,384 | B2 | 2/2016 | Davis |
| 9,378,187 | B2 | 6/2016 | Bodin et al. |
| 9,619,440 | B2 | 4/2017 | Kawara |
| 9,679,404 | B2* | 6/2017 | Douglas ................ G06F 3/0481 |
| 10,282,405 | B1 | 5/2019 | Silk et al. |
| 2002/0075496 | A1 | 6/2002 | Zhang et al. |
| 2003/0061062 | A1 | 3/2003 | Tucker |
| 2004/0015539 | A1 | 1/2004 | Alegria et al. |
| 2004/0083425 | A1 | 4/2004 | Dorwart |
| 2005/0039119 | A1 | 2/2005 | Parks et al. |
| 2005/0216431 | A1 | 9/2005 | Baker et al. |
| 2005/0246353 | A1 | 11/2005 | Ezer et al. |
| 2006/0277481 | A1* | 12/2006 | Forstall ................ G06F 16/957 |
| | | | 715/764 |
| 2007/0055939 | A1 | 3/2007 | Furlong et al. |
| 2007/0061752 | A1 | 3/2007 | Cory |
| 2007/0192363 | A1 | 8/2007 | Larsen |
| 2008/0092051 | A1* | 4/2008 | Sidon ................. G06F 16/9038 |
| | | | 715/731 |
| 2008/0320380 | A1* | 12/2008 | Pan ..................... G06F 40/174 |
| | | | 715/210 |
| 2009/0112830 | A1* | 4/2009 | Denoue .................. G06F 16/58 |
| 2009/0303239 | A1 | 12/2009 | Ang et al. |
| 2009/0313209 | A1 | 12/2009 | Lu et al. |
| 2010/0088605 | A1 | 4/2010 | Livshin et al. |
| 2011/0161348 | A1* | 6/2011 | Oron ..................... G06F 16/70 |
| | | | 707/769 |
| 2012/0041903 | A1 | 2/2012 | Beilby et al. |
| 2012/0254713 | A1 | 10/2012 | Roth et al. |
| 2012/0259891 | A1 | 10/2012 | Edoja |
| 2013/0138423 | A1 | 5/2013 | David et al. |
| 2013/0174032 | A1 | 7/2013 | Tse et al. |
| 2014/0195884 | A1 | 7/2014 | Castelli et al. |
| 2014/0250361 | A1 | 9/2014 | Wineman et al. |
| 2014/0372855 | A1 | 12/2014 | Myerscough et al. |
| 2015/0066501 | A1* | 3/2015 | Thapliyal ............... G06F 40/47 |
| | | | 704/235 |
| 2015/0142800 | A1* | 5/2015 | Thapliyal ............. G06F 16/345 |
| | | | 707/737 |
| 2015/0248429 | A1* | 9/2015 | Pregueiro ............... G06T 11/60 |
| | | | 715/202 |
| 2016/0196358 | A1 | 7/2016 | Bell et al. |
| 2017/0177559 | A1 | 6/2017 | Dang et al. |
| 2017/0371856 | A1* | 12/2017 | Can ...................... G06K 9/3233 |
| 2018/0129372 | A1 | 5/2018 | Ellis et al. |
| 2018/0129373 | A1 | 5/2018 | Ellis et al. |
| 2018/0129946 | A1 | 5/2018 | Ellis et al. |
| 2018/0131803 | A1 | 5/2018 | Ellis et al. |
| 2018/0144421 | A1 | 5/2018 | Williams et al. |
| 2018/0157467 | A1 | 6/2018 | Stachura |
| 2018/0157468 | A1 | 6/2018 | Stachura |
| 2018/0165260 | A1 | 6/2018 | Soni |
| 2018/0324115 | A1 | 11/2018 | Aggarwal et al. |
| 2019/0087780 | A1* | 3/2019 | Cerqueira .......... G06K 9/00456 |
| 2019/0095255 | A1* | 3/2019 | Anima ................. G06F 40/151 |
| 2019/0138588 | A1 | 5/2019 | Silk et al. |
| 2019/0179916 | A1* | 6/2019 | Sivaji .................... G06F 3/0481 |
| 2019/0180098 | A1 | 6/2019 | Carpenter et al. |
| 2020/0042579 | A1 | 2/2020 | Ben-ishay et al. |
| 2020/0042587 | A1 | 2/2020 | Ben-ishay et al. |
| 2020/0042606 | A1 | 2/2020 | Ben-ishay et al. |

OTHER PUBLICATIONS

"Non-Final Office Action Issued in U.S. Appl. No. 16/052,380", dated Nov. 20, 2019, 15 Pages.

"Convert Presentation into Word Document—Compare Kingsoft Office with Microsoft Office", Retrieved from: http://www.kingsoftstore.com/news/3104-convert-powerpoint-presentation-into-word-document-comparison.html, Sep. 21, 2012, 3 Pages.

"Convert Word, Excel, or PowerPoint to PDF", Retrieved from: https://web.archive.org/web/20170825213058/https://acrobat.adobe.com/in/en/acrobat/how-to/word-excel-ppt-to-pdf-converter.html, Aug. 25, 2017, 5 Pages.

"PPT to DOC", Retrieved from: https://www.zamzar.com/convert/ppt-to-doc/, Retrieved on Jun. 13, 2018, 3 Pages.

"PPT to DOC (Word) Converter", Retrieved from: https://convertio.co/ppt-doc/, Retrieved on Jun. 13, 2018, 2 Pages.

"Why converting Presentation to Word Documents", Retrieved from: https://web.archive.org/web/20170424234416/https:/help.wps.com/articles/convert-powerpoint-to-word.html, Apr. 24, 2017, 4 Pages.

Russell, Wendy, "Converting PowerPoint Presentations to Word Documents", Retrieved from: https://www.lifewire.com/converting-powerpoint-2010-slide-shows-to-word-documents-2767227, Retrieved on Jun. 13, 2018, 15 Pages.

"International Search Report and Written Opinion Issued in PCT Application No. PCT/US2019/038796", dated Sep. 12, 2019, 10 Pages.

"International Search Report and Written Opinion Issued in PCT Application No. PCT/US2019/038815", dated Sep. 12, 2019, 10 Pages.

"Bot Users", Retrieved from: https://api.slack.com/bot-users, Jun. 13, 2018, 16 Pages.

"Generating sides from spreadsheet data (The G Suite Dev Show)", Retrieved from: https://www.youtube.com/watch?v=h2_oiGv3ZdQ, Nov. 30, 2016, 3 Pages.

"Inserting an Image into a Page in FrontPage—'How to' Guides—Web Editors' support—Web Editors' Handbook—LSE", Retrieved from: http://www.lse.ac.uk/intranet/staff/webSupport/guides/archivedWebeditorsHandbook/webEditorsSupport/howToGuides/insertingImage.htm, Aug. 19, 2019, 2 Pages.

"Integrate External Services with Microsoft Teams via Custom Bot", Retrieved from: http://www.winwire.com/integrate-external-services-with-microsoft-teams-via-custom-bot/, May 15, 2017, 7 Pages.

"Texmaker: Free LaTeX Editor", Retrieved from: https://web.archive.org/web/20050829223138/https://www.xm1math.net/texmaker/doc.html#SECTION110, Aug. 29, 2005, 10 Pages.

"The 3 Essentials of AI Bots, for IT Help Desk", Retrieved from: https://chatbotsmagazine.com/the-3-essentials-of-ai-bots-for-it-help-desk-9bce2ffa4446, Dec. 20, 2017, 7 Pages.

Ghoshal, Abhimanyu, "Automated Insights' free Excel Plugin Turns Your Charts into Reports On-the-Fly", Retrieved from: https://thenextweb.com/apps/2016/05/24/automated-insights-free-excel-plugin-turns-charts-reports-fly/, May 24, 2016, 5 Pages Guay, Matthew, "How to Automatically Generate Charts and Reports in Google Sheets and Docs", Retrieved from: https://zapier.com/blog/google-sheets-explore-ai/, Jan. 18, 2017, 10 Pages.

Iqbal, et al., "Embed a bot in an app", Retrieved from: https://docs.microsoft.com/en-us/azure/bot-service/bot-service-design-pattern-embed-app?view=azure-bot-service-3.0, Dec. 13, 2017, 3 Pages.

Keisar, Tzvi, "Export Power BI report to PowerPoint (Preview)", Retrieved from: https://powerbi.microsoft.com/en-us/blog/export-power-bi-report-to-powerpoint-preview/, Oct. 17, 2016, 8 Pages.

Niekerk, Piet Van. "Chat Apps, Bots and the Integration of Publisher Content", Retrieved from: https://www.fipp.com/news/features/chat-apps-bots-integration-publisher-content, Feb. 8, 2017, 7 Pages.

"International Search Report and Written Opinion Issued in PCT Application No. PCT/US19/038800", dated Sep. 2, 2019, 15 Pages.

"International Search Report and Written Opinion Issued in PCT Application No. PCT/US19/038809", dated Sep. 5, 2019, 10 Pages.

"Non Final Office Action issued in U.S. Appl. No. 16/052,364", dated Apr. 29, 2020, 13 Pages.

"Final Office Action issued in U.S. Appl. No. 16/052,380", dated May 29, 2020, 21 Pages.

Michael, "How to Build & Print Your Mailing List by Using Microsoft Excel and MS Word", Retrieved From: https://www.experian.com/blogs/small-business-matters/2011/07/20/mailing-list-excel/, Jul. 20, 2011, 9 Pages.

"Final Office Action Issued in U.S. Appl. No. 16/052,372", dated Aug. 5, 2020, 29 Pages.

(56) References Cited

OTHER PUBLICATIONS

"Non Final Office Action Issued in U.S. Appl. No. 16/052,372", dated Mar. 18, 2021, 30 Pages.
"Non-Final Office Action Issued in U.S. Appl. No. 16/052,364", dated Jan. 14, 2021, 17 Pages.
"Final Office Action Issued in U.S. Appl. No. 16/052,364", dated Nov. 13, 2020, 17 Pages.
"Notice of Allowance Issued in U.S. Appl. No. 16/052,380", dated Nov. 19, 2020, 11 Pages.

* cited by examiner

CROSS-APPLICATION INGESTION AND RESTRUCTURING OF SLIDE PRESENTATION CONTENT

BACKGROUND

There are a wide variety of different types of computing systems. Such computing systems can be disposed in different types of architectures. Some are local computing systems which reside on a machine or user device. Others host services in a remote server environment, such as in the cloud. Still others have components disposed on a user device (such as client components) with other components or functionality disposed in a remote server environment.

All of these different types of architectures can run content generation applications. These types of applications are often used by users to generate content or documents. Some examples of content generation applications include word processing applications, spreadsheet applications, slide presentation applications, among others.

Some of these types of applications include logic that generates insights based upon the content. For instance, a spreadsheet application may identify patterns or other correlations in data entered into a table in the spreadsheet. The insight logic may then surface those insights for the user. An insight provides a single insight (correlation, pattern, etc.) for a given data set within the boundaries of the spreadsheet document.

It is also common for users to use the same data or content across different content generation applications. For instance, a user may wish to generate a slide presentation from data in a source document, such as a spreadsheet document. Similarly, a user may wish to summarize a source document (such as a slide presentation) in a word processing document. In order to do this, users often resort to copying and pasting content from the source document (generated in one content generation application) into another document (generated using another content generation application). The user then adjusts the format and relevant content in the newly created document. In other cases, the user rewrites the content from scratch into the new document.

In addition, when the content in the source document changes, then that content also needs to be updated by the user in the newly created document.

The discussion above is merely provided for general background information and is not intended to be used as an aid in determining the scope of the claimed subject matter.

SUMMARY

A content generation computing system includes content generating application logic. The content generating application logic runs a content generation application to generate content. It also includes content ingestion and transformation logic that allows a user to identify slide presentation content from a source document for ingestion into a document that is being generated. The system automatically restructures graphical objects in the ingested slide presentation content based upon the content generation application into which it is being ingested.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
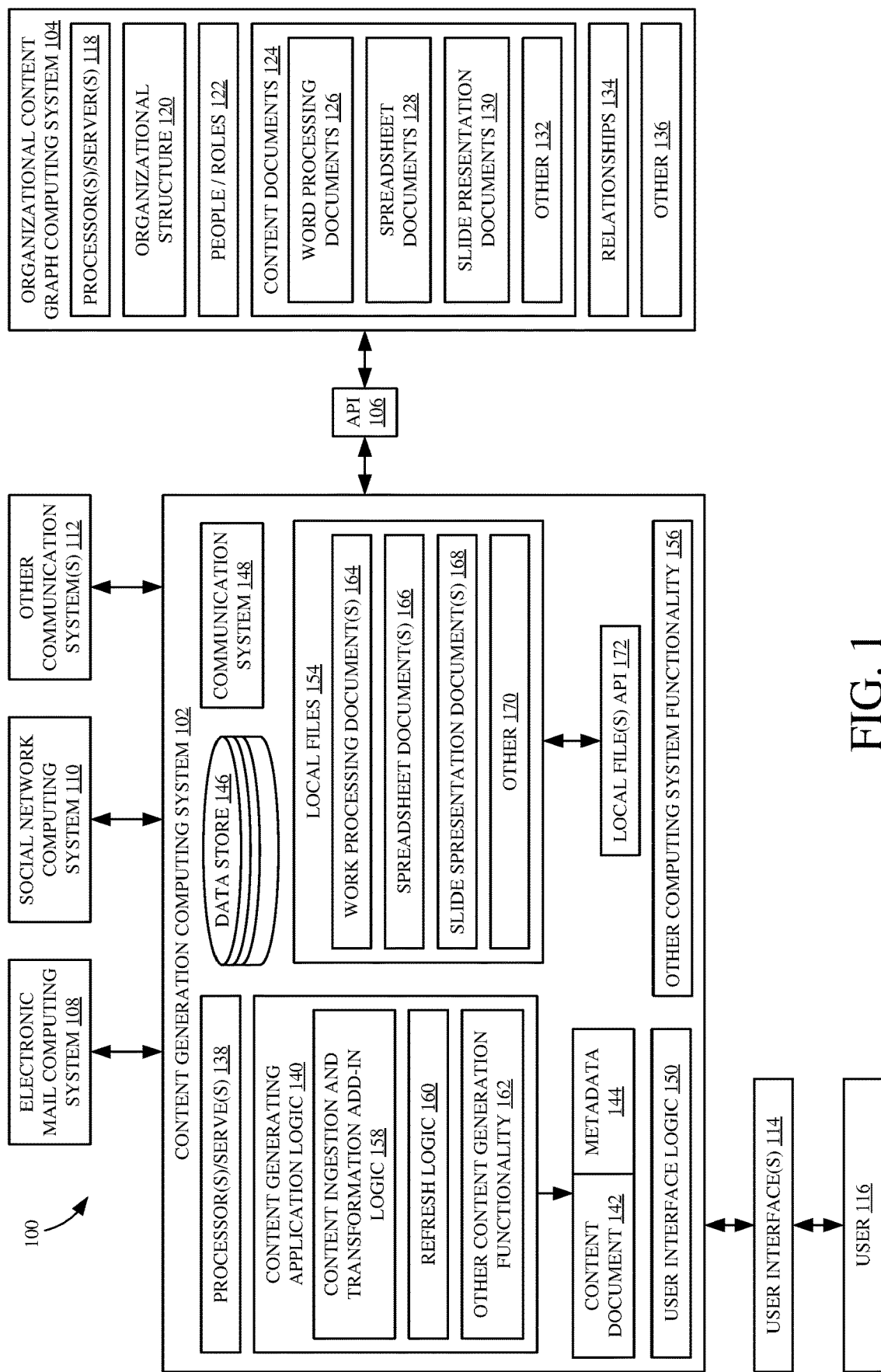
FIG. 1 is a block diagram of one example of a computing system architecture.

FIG. 1 is a block diagram showing one example of a computing system architecture 100. Architecture 100 illustratively includes content generation computing system 102 that has access to an organizational content graph computing system 104 through an application programming interface (API) 106 exposed by computing system 104. FIG. 1 also shows that content generation computing system 102 illustratively has access to an electronic mail (email) computing system 108, social network computing system 110, and it can have access to other communication systems or computing systems 112. In addition, FIG. 1 shows that, in one example, content generation computing system 102 illustratively generates user interfaces 114 for interaction by user 116. User 116 illustratively interacts with user interfaces 114 in order to control and manipulate content generation computing system 102 and some parts of organizational content graph computing system 104 and the other computing systems 108-112.

In addition, while FIG. 1 shows that content generation computing system 102 communicates with the other systems directly, or through an API, it can communicate with those systems over a network as well. The network may be a wide area network, a local area network, a near field communication network, a cellular communication network, or a wide variety of other networks or combinations of networks.

In the example shown in FIG. 1, organizational content graph computing system 104 illustratively maintains an organizational content graph which graphs relationships between entities, or items, in an organization. Those items can be documents (such as spreadsheet documents 128, word processing documents 126, slide presentation documents 130, and other documents or items of content) users (such as employees, the roles that they hold, etc.) among other things. Therefore, in one example, computing system 104 includes one or more processors or servers 118, an organizational structure 120 which identifies the structure of the organization for which the content graph in computing system 104 is being maintained, people and/or roles that they hold 122, and the relationship between them, given the content organizational structure 120. The content graph illustratively tracks content interaction (by users), user interactions, and other information and uses machine learning mechanisms to identify connections between people, content and activities in an organization (such as a company).

Through the exposed API 106, computing system 104 facilitates unified search capability across different applications and data stores. The different items of content 124 and people 122 can be represented by nodes in the graph and the relationships 134 can be represented by edges connecting the nodes. The relationships 134 can be weighted based on a strength of the relationship, and relationships 134 may also indicate a type of relationship. For instance, if two users communicate with one another often, such as using email systems, then the relationship 134 or edge between those user nodes may be weighted more heavily than if they communicate with one another seldomly. The same can be done with respect to relationships 134 between users 122 and content documents 124. If a user accesses a particular content document often, then the edge between that user and that content document may be weighted more heavily than otherwise. Further, relationships between documents 124 can be derived from a structure of the directory in which they are found.

The relationships 134 may reflect interactions among users, interactions of users with content documents, relationships between content documents (such as that they were authored by the same persons, are related to the same subject matter, etc.) among a wide variety of other relationships. In addition, organizational content graph computing system 104 may include a wide variety of other items 136, such as user preferences, user tendencies, etc. Some of these are described in greater detail below.

Organizational content graph computing system 104 illustratively exposes API 106 for interaction by content generation computing system 102. Content generation computing system 102 can thus interact with API 106 in order to obtain information from organizational content graph computing system 104.

In the example illustrated in FIG. 1, content generation computing system 102 illustratively includes processors or servers 138, content generating application logic 140 that is used to run a content generation application to generate a content document 142 and corresponding metadata 144. System 102 also illustratively includes data store 146, communication system 148, user interface logic 150, a set of one or more local files 154 (which may be stored in data store 146 or elsewhere) and a wide variety of other computing system functionality 156.

Before describing the operation of content generation computing system 102, in ingesting and restructuring content from a source application, a brief description of some of the items in computing system 102, and their operation, will first be provided.

Content generating application logic 140 illustratively includes content ingestion and transformation add-in logic 158, refresh logic 160, and it can include a wide variety of other content generation functionality 162. Local files 154 illustratively include word processing documents 164, spreadsheet documents 166, slide presentation documents 168 and it can include a wide variety of other documents 170. The documents can be accessed through a local files API 172.

Communication system 148 illustratively allows items in content generation computing system 102 to communicate with one another, and to communicate with the other systems shown in FIG. 1. Therefore, communication system 148 may vary, depending upon the types of systems that it is communicating with, and depending upon the networks (if any) it is using to communicate with them.

User interface logic 150 illustratively generates user interfaces 114 and detects user interactions with those user interfaces. It provides an indication of the user interactions to other items in computing system 102, and it can provide them to other items in FIG. 1 as well, either directly, or through different pieces of computing system 102.

Briefly, in operation, content generating application logic 140 illustratively runs a content generation application that is launched by user 116 through an appropriate user interface 114. For the sake of the present discussion, assume that content generating application logic 140 is running a word processing application that is used by user 116 in order to generate a word processing document (content document 142). It will be noted that, while logic 158 is shown as an add-in to the content generation application, it can just as easily be a separate component or piece of logic that is separate from the content generation application. Both of these, and other architectures are contemplated herein.

The word processing application illustratively includes the add-in logic 158 which allows user 116 to specify source content generated using a different type of content generating application (such as content from a slide presentation document) to be ingested into the word processing document that user 116 is generating. In doing so, content ingestion and transformation add-in logic 158 generates a link to the source slide presentation document which contains the source content that is ingested into the word processing document being created by user 116. That link is added to the metadata of the document being created and is used by refresh logic 160 to refresh the ingested content in the word processing document, when the content in the source document (the slide presentation document) changes. This refresh processing is also described in greater detail below.

In addition, once the information from the source document (e.g., the content in the slide presentation document) is identified for ingestion, then content ingestion and transformation add-in logic 158 automatically parses the content, analyzes it, identifies insights in that content in various ways, and fundamentally restructures the content so that it can be displayed in the content document 142 being generated (e.g., in the word processing document being generated by user 116).

The restructuring is performed in a variety of different ways, as is described in greater detail below. Briefly, a conversational user interface element (such as a bot) conducts a dialog with user 116 to identify the content to be ingested. It can do this by identifying available content for ingestion (by accessing organizational content graph computing system 104 and local files 154) and presenting the available files to user 116 for selection. It then accesses the source content that the user has identified as the content to be ingested and provides it to an analysis system which begins analyzing it. The conversational user interface also conducts additional dialog with user 116 to obtain additional information from user 116 (such as who the intended recipients are, such as to disambiguate the importance of information in the ingested content, such as to verify insights, relationships or patterns identified in the ingested content, among other things) that are used during the restructuring or transformation process.

The analysis system can obtain a wide variety of different types of information in order to identify new insights and perform additional analysis. It can use artificial intelligence or other mechanisms to consider the information in the ingested content, itself. It can identify other related documents (such as other documents recently worked on by user 116, recently shared by or to user 116, documents that are frequently accessed by user 116, the other users or roles that user 116 normally shares documents with, user preferences, customizations that are normally made by user 116 to ingested content, templates normally used by user 116, among a wide variety of other things). It can identify a metric for different parts of the source content which identifies a relevance or importance (or other measure) of the different parts of the source content to the document being created. Add-in logic 158 then restructures the source content so it is incorporated into the document being created, based (at least in part) on the metric.

Once the restructuring is complete, the content document 142 is presented to user 116. The conversational user interface in content ingestion and transformation add-in logic 158 then solicits feedback from user 116 as to how satisfied user 116 is with the restructured content. It also solicits feedback indicating what changes user 116 wishes to make to the restructured content, and it saves those changes for future use. Content ingestion and transformation add-in logic 158 will now be described in more detail.

Figure 2:
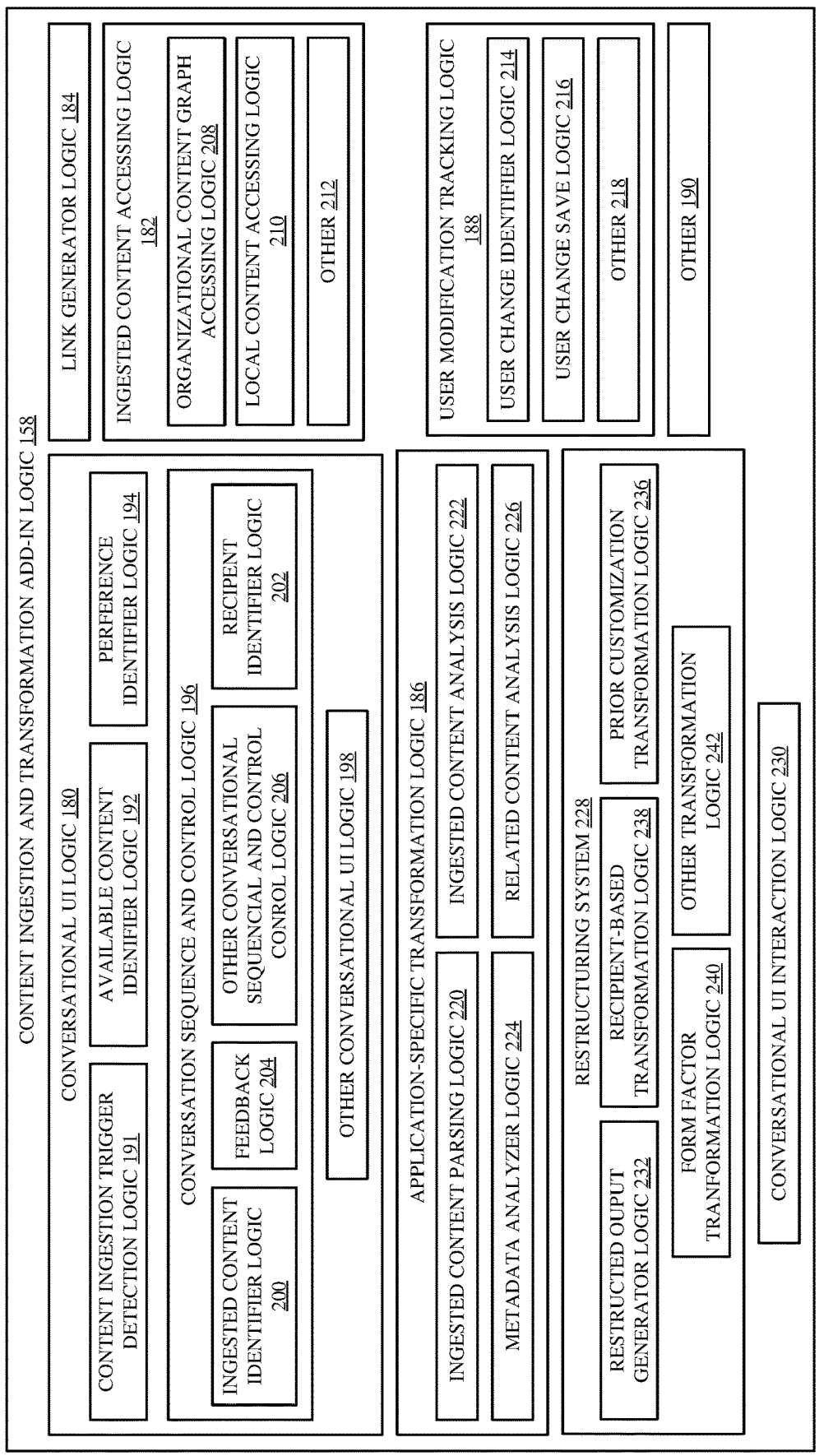
FIG. 2 is a block diagram showing one example of content ingestion and transformation add-in logic, in more detail.

FIG. 2 is a block diagram showing one example of content ingestion and transformation add-in logic 158. In the example shown in FIG. 2, it can be seen that logic 158 illustratively includes conversational user interface (UI) logic 180, ingested content accessing logic 182, link generator logic 184, application-specific transformation logic 186, user modification tracking logic 188, and it can include a wide variety of other functionality 190. Conversational UI logic 180 itself, illustratively includes available content identifier logic 192, preference identifier logic 194, conversation sequence and control logic 196, and it can include other conversational UI functionality 198. Conversation sequence and control logic 196, itself, illustratively includes ingested content identifier logic 200, recipient identifier logic 202, feedback logic 204, and it can include a wide variety of other conversational sequence and control logic 206.

Ingested content accessing logic 188 illustratively includes organizational content graph accessing logic 208, local content accessing logic 210, and it can include other items 212. User modification tracking logic 188 illustratively includes user change identifier logic 214, user change save logic 216, and it can include other items 218.

Application-specific transformation logic 186 illustratively includes ingested content parsing logic 220, ingested content analysis logic 222, metadata analyzer logic 224, related content analysis logic 226, restructuring system 228, conversational UI interface logic 230, and restructured output generator logic 232. Restructuring system 228, itself, illustratively includes prior customization logic 236, recipient-based transformation logic 238, form factor transformation logic 240, and it can include a wide variety of other transformation logic 242. Some of the items in logic 158 will now be described in more detail.

It will be noted that the operation of conversational UI logic 180 is described in greater detail below with respect to FIG. 5. Briefly, however, at some point, content ingestion trigger detection logic 191 detects a trigger indicating that user 116 wishes to inject content into the document that user 116 is currently creating. Assume, for instance, that user 116 is creating a word processing document. Assume further that user 116 has provided an input through a suitable user interface 114 indicating that the user wishes to ingest content, into the word processing document, from a different document (e.g., a source document). In that case, content ingestion trigger detection logic 191 detects the user input, and available content identifier logic 192 begins looking for content that is available to user 116, for ingestion into the word processing document that he or she is currently creating. Available content identifier logic 192 can access organizational content graph computing system 104 through API 106. It can also access local files 154 through API 172.

In addition, preference identifier logic 194 can access user preferences which may be stored in organizational content graph computing system 104 as well. Those preferences may indicate the particular types of content that the user wishes to ingest, the types of information that the user normally considers to be important (and that was included in other content documents), the templates user 116 normally uses, among a wide variety of other things.

Conversation sequence and control logic 196 then conducts a dialog with user 116, sequencing questions and responses based on user inputs. In one example, ingested content identifier logic 200 conducts a conversation with user 116 to assist user 116 in identifying the source document from which content is to be ingested. In one example, available content identifier logic 192 provides a list of available content (e.g., a list of documents or files), from which content can be ingested, and content in that list may be made available for selection by user 116, by logic 196. In another example, logic 200 can provide a text box where the user can identify the source document from which content is to be ingested. These and other scenarios are contemplated herein.

Recipient identifier logic 202 illustratively generates a dialog with user 116 in an attempt to identify the intended recipient of the content that the user is currently generating. This may be used in analyzing that content and restructuring it for the user.

Other conversational sequence and control logic 206 can be used while application-specific transformation logic 186 is restructuring the ingested content. It can be used to obtain additional information from user 116 about a wide variety of different things, some of which are described in more detail below.

Once the restructured, ingested content is presented to the user, feedback logic 204 generates a dialog with user 116 to obtain feedback from user 116 indicative of how satisfied user 116 is with the restructured content. It also illustratively allows the user to make changes to the restructured content (or the ingesting system or application can make changes) and it tracks those changes so that they can be used when the restructured content is refreshed (such as when the content in the source document changes) and in restructuring content in the future.

When ingested content identifier logic 200 identifies the source document of the content to be ingested, then ingested content accessing logic 182 accesses that content and provides it to application-specific transformation logic 186, so that it can be restructured and ingested into the content currently being created by user 116. Organizational content graph accessing logic 208 can access content (such as content documents 124) stored on organizational content graph computing system 104. It can do this by invoking API 106, for instance. Local content accessing logic 210 accesses content stored in local files 154. It can do this by invoking local files API 172. It can access content to be ingested in other ways as well.

Link generator logic 184 generates a link between the ingested content that is restructured and placed in the content being generated by user 116, and the source document from which it was ingested. It illustratively maintains that link, in relation to the content that is currently being created by user 116 (e.g., as metadata for the document being created), so that that the link can be used to refresh the content currently being created, when the ingested content in the source document changes. This is also described in more detail below.

When the restructured content is displayed to user 116, user modification tracking logic 188 tracks the various changes that the user may make (and/or that the ingesting system or other system or application may make) to the restructured content, so that those changes can be applied when the content is refreshed. Those changes can also be used in generating restructured content in the future, since they may be indicative of user preferences. Thus, user change identifier logic 214 identifies any (user or system) changes that are made to the restructured content, when it is presented to the user. User change save logic 216 saves those changes, as separate values that are separated from the restructured content, so that they can be applied when the content is refreshed, or so that they can be used in analyzing content that is ingested in the future.

Application-specific transformation logic 186 is the logic that performs the restructuring on the ingested content so that it is restructured from the structure in which it exists in the source document into the structure in which it will be represented in the content being generated. By way of example, where the user is ingesting content from a slide presentation document, into a word processing document that is currently being generated, then logic 186 automatically restructures the slide presentation content so that it can be used in the word processing document. The restructuring can be done in an application-specific way so that certain restructuring may be done when ingesting content from a slide presentation document into a word processing document in a first way, but the restructuring can be done in a second way when ingesting content from, for example, a spreadsheet document into a slide presentation document. These are just examples. By "automatically" it is meant that the process can be completed without further user involvement, except perhaps to initiate or authorize the process.

It will also be noted, while the present discussion proceeds with respect to much of the restructuring logic being contained in application-specific transformation logic 186, it will be appreciated that the functionality performed by logic 186 can be dispersed through the other components or other items or logic in content ingestion and transformation add-in logic 158. Therefore, some of the functionality described herein with respect to logic 186 may be performed by conversational UI logic 180. Other functionality may be performed by ingested content accessing logic 182, link generator logic 184, user modification tracking logic 188, or other items. It is shown as being performed by application-specific transformation logic 186 for the purposes of example and explanation only.

Ingested content parsing logic 220 illustratively parses the source document from which content is to be ingested. It can do this in a variety of different ways, depending upon the type of document being parsed. For instance, if the document being parsed is a spreadsheet, then it may be parsed into the different types of objects in the spreadsheet (such as charts, tables, etc.), the links between those items in the underlying data (such as the links to the tables from which a chart draws data, etc.), among a wide variety of other things. If the document being parsed is a slide presentation, it may be parsed into the individual slides, identifying slide sequence, the text on the slides, the various graphics on the slides, symbols that may represent a sequence or other relationships among the items on the slides, etc. When the document being parsed is a word processing document, it may be parsed into the document parts (such as title, paragraphs, headings, sections, tables or other graphic items included in the document, metadata, among other things). The parsing can be done by analyzing tags on the document, other code or content itself. In addition, the ingested content parsing logic 220 may identify metadata on the document (such as who the document has been shared with, the permissions associated with the document, who created the document, when it was created, when it was last modified, among a wide variety of other metadata), and provide that to metadata analyzer logic 224 as well. Ingested content analysis logic 222, and metadata analyzer logic 224 then perform analysis on the ingested content and the corresponding metadata, respectively, in order to identify insights or relationships in that data and metadata, and in order to identify data that is important and in order to enhance the restructuring of the important data to be ingested. As an example, the ingested content can be analyzed to identify a value or metric indicative of how important or relevant each part (identified by parsing logic 220) is to the content being created. Some examples of this are also described in more detail below.

Related content analysis logic 226 identifies related content (such as other documents created or shared by this user, other documents shared with this user, documents created or shared by other people that are closely related to this user in the organizational content graph maintained by computing system 104, documents that are often accessed by this user or documents that are most recently accessed by this user, among other things. It can identify that content and analyze it to determine the subject matter of the content, how that content was laid out, the information that was considered important by the user (such as highlighted information, information that is the subject of charts or graphs or other graphics, etc.).

The analysis results from logic 222, 224 and 226 (and any other analysis results) are illustratively provided to restructuring system 228. Recipient-based transformation logic 238 can generate control signals so the content is restructured based upon the intended recipient. For instance, if user 116 is a professor and the intended recipients are students, then the restructuring may be presented in one way (such as in a step-by-step process, etc.) that may be useful in teaching. If the content is intended for the user's manager or a coworker, then the role that that coworker plays may be used in restructuring the content. If the recipient, for instance, is an analyst, then it may be that logic 238 generates control signals so a great deal of detail is provided in the restructured content. However, if the recipient is a manager or supervisor, then it may be that the content is restructured in a more summary fashion. These are examples of restructuring content that can be performed by recipient-based transformation logic 238.

Prior customization transformation logic 236 illustratively identifies prior customizations that user 116 has made to ingested content. For instance, if system 158 has ingested and restructured similar content for user 116, and then user 116 has made customizations to that restructured data, those customizations will illustratively be considered by prior customization transformation logic 236 in generating the current restructured data. By way of example, assume that a prior set of restructured content included pie charts and that was displayed to user 116. Assume also that the user converted all of those pie charts into bar charts (or other charts). This will be considered by logic 236 in generating control signals so that transformation logic 186 may preferentially generate bar charts instead of pie charts. Again, this is only one example.

Form factor transformation logic 240 illustratively generates control signals to guide the restructuring of the content based upon the intended form factor of the device on which the content will be displayed. If the device is a mobile device, then the content may be restructured in one way, whereas if it is a large screen device, then the content may be restructured in a different way.

Other transformation logic 242 illustratively takes into account any or all of the other analysis results generated by ingested content analysis logic 222, related content analysis logic 226, metadata analyzer logic 224, etc. All of this information can be used in generating control signals to guide the restructuring of the content that is being ingested into the current document.

Once the restructuring is complete, restructured output generator logic 232 generates an output indicative of the restructured content, so that it can be provided to user 116. During the entire process, conversational UI interaction logic 230 illustratively interacts with conversational UI logic 180 so that it can obtain additional information from the user, when that would be helpful, and so that it can provide the user with updates as to where logic 186 currently is in the restructuring process. These and other items are described in greater detail below with respect to FIGS. 4-5.

Figure 3:
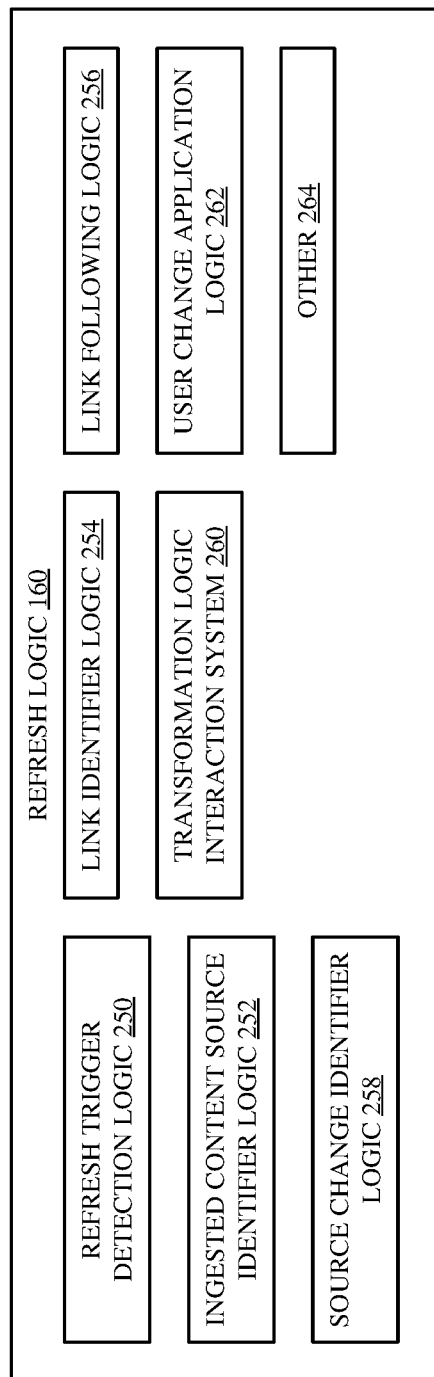
FIG. 3 is a block diagram showing one example of refresh logic, in more detail.

FIG. 3 is a block diagram showing one example of refresh logic 160, in more detail. In the example illustrated in FIG. 3, refresh logic 160 illustratively includes refresh trigger detection logic 250, ingested content source identifier logic 252, link identifier logic 254, link following logic 256, source change identifier logic 258, transformation logic interaction system 260, user change application logic 262, and it can include a wide variety of other items 264.

Refresh trigger detection logic 250 detects a refresh trigger indicating that it is time to refresh the ingested content. The trigger can be any of a wide variety different types of triggers, such as that the source content was changed, that a scheduled refresh is to be performed, that the user has expressly requested a refresh operation, among others. Additional refresh triggers are described below. Ingested content source identifier logic 252 then identifies the source document from which content was ingested into the document to be refreshed. Link identifier logic 254 identifies the link to that source document and link following logic 256 allows refresh logic 160 to follow the link (such as using ingested content accessing logic 182) to obtain access to the source document from which the content was ingested.

Source change identifier logic 258 identifies any changes to the source content that was ingested, and transformation logic interaction system 260 provides the refreshed (changed) content to the application-specific transformation logic 186 so that a refreshed transformation can be generated. User change application logic 262 then applies any changes that were made to the original restructured content, so that they are applied to the refreshed, restructured content. Refresh logic 160 can perform other operations as well.

Figure 4A:
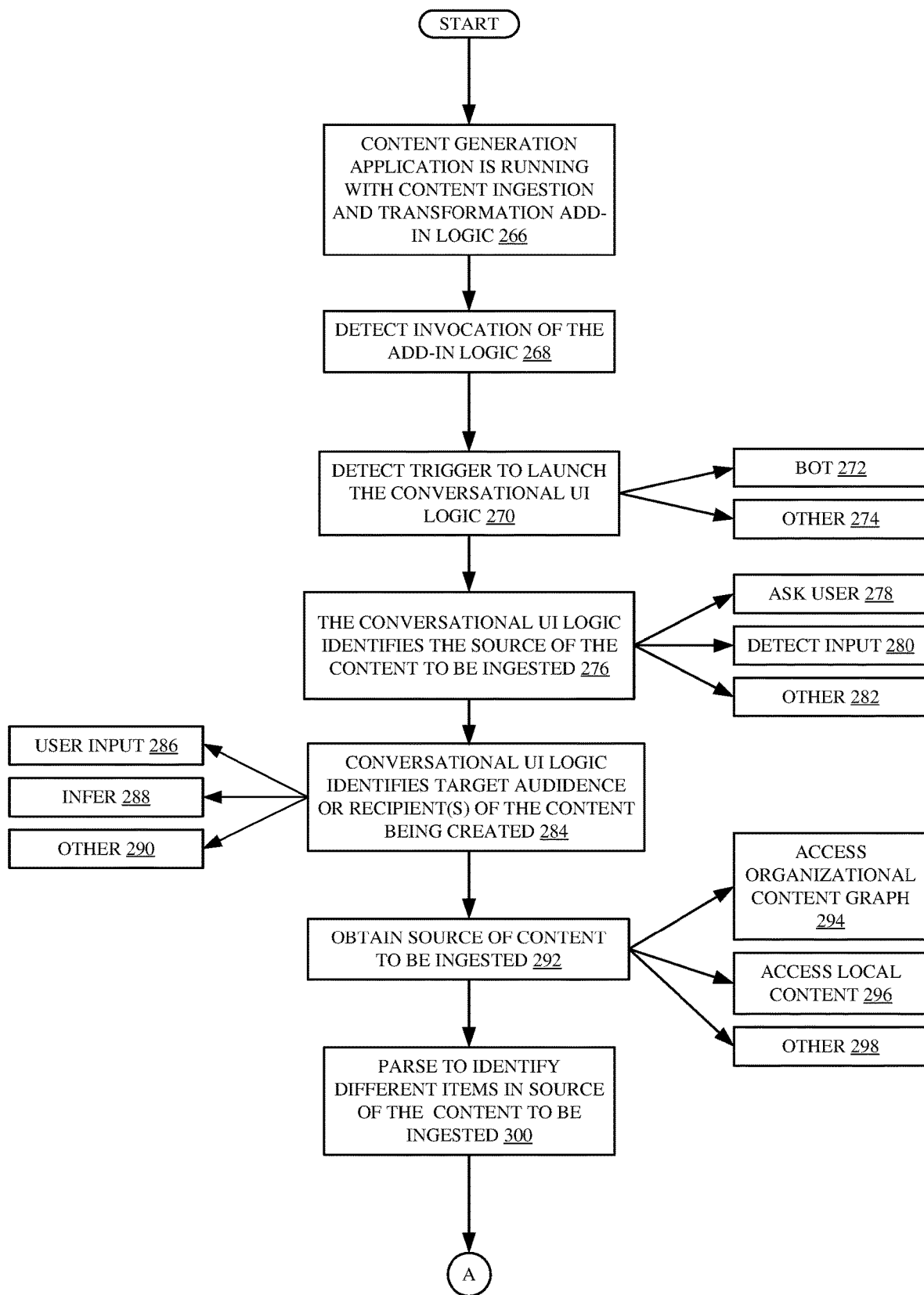
FIGS. 4A-4C (herein after referred to as FIG. 4) illustrate a flow diagram showing one example of the operation of the architecture illustrated in FIG. 1 ingesting content from a source document created using one content generation application into a target document created using a different content generation application.
Figure 4B:
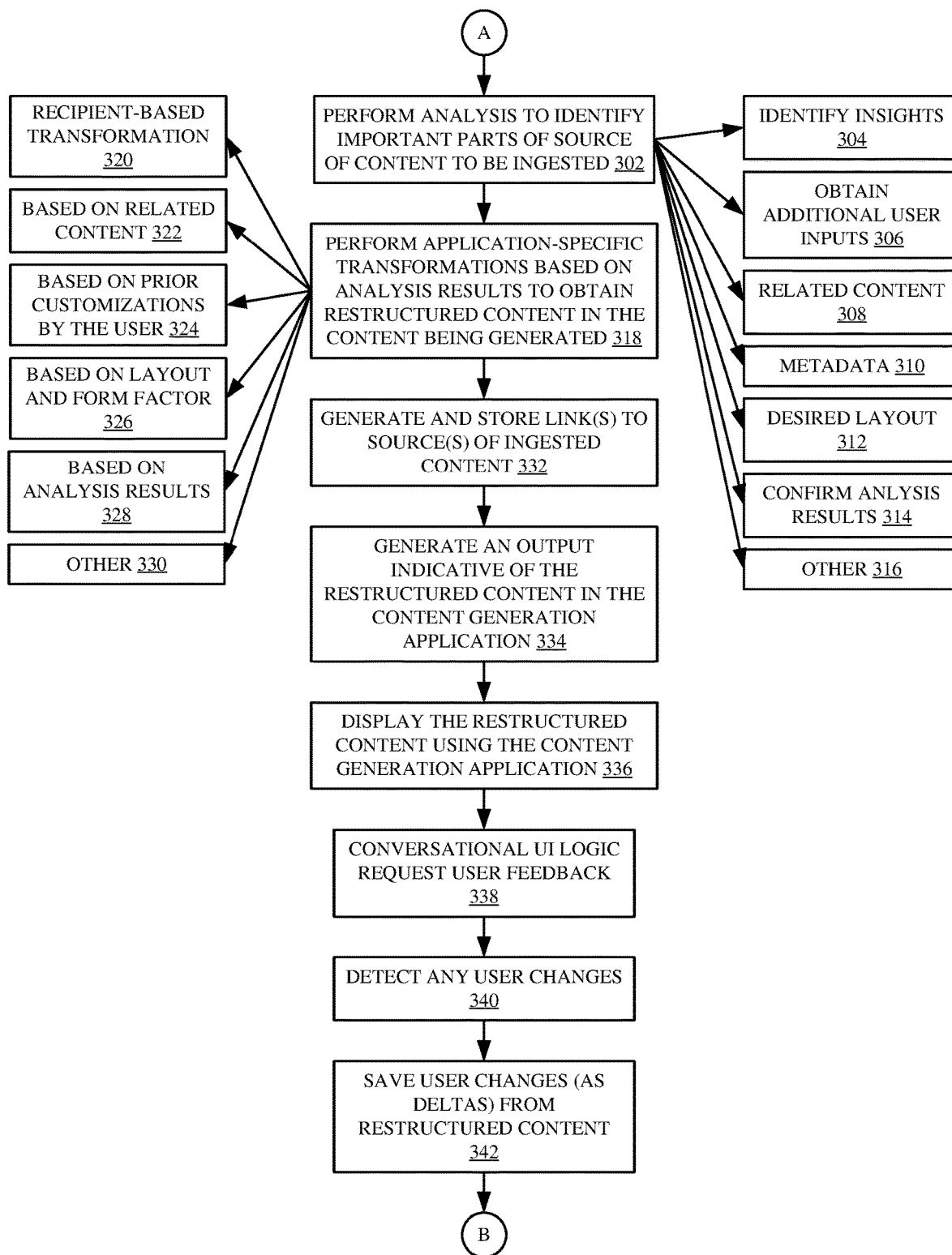
Figure 4C:
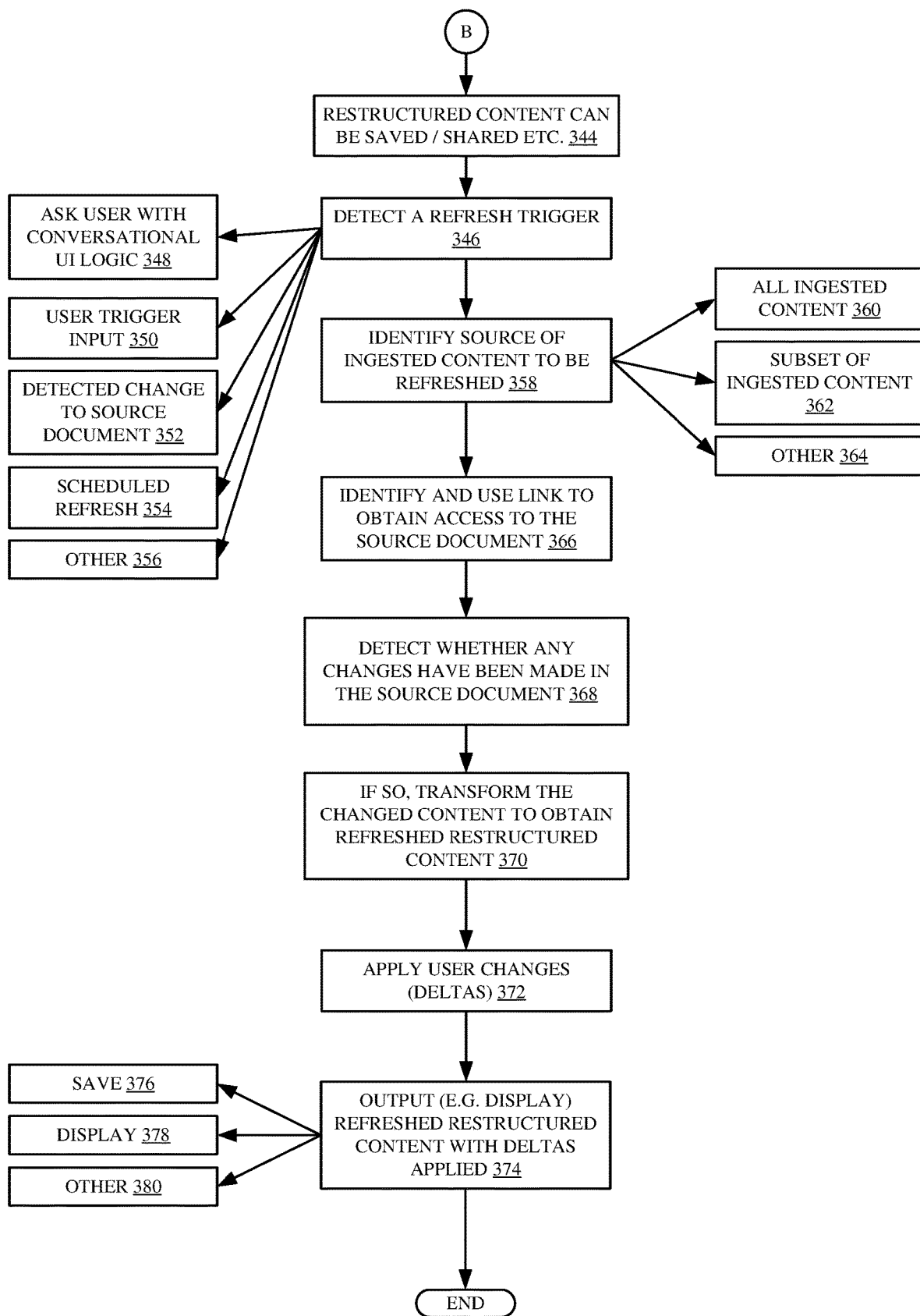

FIGS. 4A-4C (collectively referred to herein as FIG. 4) illustrate a flow diagram showing one example of the operation of content generating application logic 140 in ingesting and restructuring content from a document created using a different application. It is first assumed that a content generation application is running in content generating application logic 140, and that the application has content ingesting and transformation add-in logic 158 incorporated into it. This is indicated by block 266 in the flow diagram of FIG. 4. Logic 158 then detects that it has been invoked or activated by the user. For instance, it may be that the user actuates an "Add-In" button or other actuator on a user interface display that is displayed by the content generation application. Detecting invocation of the Add-In logic 158 is indicated by block 268 in the flow diagram of FIG. 4.

Content ingesting trigger detection logic 191 in conversational UI logic 180 then detects a trigger indicating that it is to launch a conversation with user 116. This is indicated by block 270. It will be noted that the conversational UI logic 180 may be a bot 272 or another item of logic 274.

Ingested content identifier logic 200 then identifies the source of the content to be ingested. This is indicated by block 276. For example, it can conduct a dialog with user 116 asking the user to select from a list of content that is available for ingestion. Conducting the dialog is indicated by block 278. It can detect the user input selecting one of those documents, or it can detect a different user input identifying the source document of the content to be ingested. This is indicated by block 280. Ingested content identifier logic 200 can identify the source document for the content to be ingested in other ways as well, and this is indicated by block 282.

Recipient identifier logic 202 then identifies the target audience or intended recipients of the content being created. This is indicated by block 284. Again, it can conduct a dialog with user 116 to identify the intended recipients. Identifying the intended recipient based on a user input is indicated by block 286. It can infer intended recipients based upon the recipients of other, similar content that was created by user 116. Inferring the intended recipient is indicated by block 288. It can identify the intended receipting or target audience for the content being created in a wide variety of other was as well, and this is indicated by block 290.

Conversational UI logic 180 then controls ingested content accessing logic 182 to obtain the source document of the content to be ingested. This is indicated by block 292. Organizational content graph accessing logic 208 can access the organizational content graph in computing system 104. This is indicated by block 294. It can obtain the source document by accessing local files 154. This is indicated by block 296. It can access the source document in a wide variety of other was as well, and this is indicated by block 298.

The source document is then provided to application-specific transformation logic 186 where ingested content parsing logic 220 parses the source document to identify different items (or parts) in the source document. This is indicated by block 300. It can do this based on tags, metadata, the content itself, among other things. Some examples of this were described above.

Ingested content analysis logic 222, metadata analyzer logic 224, and related content analysis content logic 226 then perform analysis on the source of the content to be ingested to identify important parts of that source document. This is indicated by block 302. These important parts may, eventually, be the content from the source document which is actually ingested, restructured, and output to the user. The various analyzers can each generate a metric indicative of how important (or relevant or otherwise related) each part of the source document is to the document being created and how it should be restructured. Those metrics can be combined (on a per-part basis) to identify the overall importance of each part. Or, the metrics can be weighted, arranged according to priority or otherwise aggregated or combined.

The various items of analysis logic 222, 224 and 226 illustratively identify additional insights, over and above those that were identified in the content generating application that was used to generate the source document. Identifying these additional insights is indicated by block 304. The insights can be generated in a wide variety of ways, including using statistical analysis, heuristics, artificial intelligence logic, or various other models that analyze information for patterns, correlations, different types of relationships, etc.

Conversational UI interaction logic 230 also illustratively uses conversational UI logic 180 to obtain additional user inputs, if desired. This is indicated by block 306. For instance, it can generate a conversational output that confirms, with the user, the importance or relevance of any part of the source document, any additional insights identified in block 304, etc. It can ask for other additional information and the substance and sequence of the questions and responses in the conversation are determined by conversation sequence and control logic 196, based upon information that is already known, based on estimates, based on user responses, or in other ways. It can obtain additional user inputs in a wide variety of other ways as well.

Related content analysis logic 226 performs analysis based on related content. For instance, the related content can be identified based on common subject matter, based on a temporal relationship (e.g., the most recently accessed or authored documents), documents shared with the user from the user's manager or other tightly related users, or a wide variety of other things. Performing analysis based on the related content is indicated by block 308. The analysis results may generate a value indicative of how important a part of the source document is, and how it should be restructured, based on the related content.

Metadata analyzer logic 224 illustratively analyzes the metadata corresponding to the content to be ingested. This can take a wide variety of forms as well. Analyzing the content to be ingested based on its corresponding metadata is indicated by block 310.

The data can be analyzed based upon a desired layout. This is indicated by block 312. For instance, in a first layout there may be additional display real estate for different information, while in a different layout the display real estate may be somewhat limited. Thus, the data can be analyzed to determine whether it is best represented by a certain chart, by text, by other graphical information, etc., based on the desired layout.

Logic 186 can also use conversational UI interaction logic 230 to interact with conversational UI logic 180 in order to confirm the analysis results with user 116. This is indicated by block 314. By way of example, it may be that the analysis results identify certain subject matter content or information that is believed to be important to user 116 (e.g., highly relevant to the content that user 116 is creating). Logic 230 may serve as a conversational interface to dialog with the user to confirm that the information is correct, and that the identified information is indeed important to user 116 in the content to be ingested.

The different pieces of analysis logic can perform analysis to identify the important parts of the source content, and how they should be restructured, in a wide variety of other ways as well. This is indicated by block 316.

Restructuring system 228 then performs application-specific transformations or restructuring based upon the analysis results, to obtain restructured content that is incorporated into the document (or other content) that is currently being generated. Performing the transformations or restructuring is indicated by block 318 in the flow diagram of FIG. 4. Recipient-based transformation logic 238 illustratively performs recipient-based restructuring or transformations. This is indicated by block 320 in the flow diagram of FIG. 4. By way of example, if the intended recipients are students, then the material may be restructured in a certain way. However, if the intended recipient is the user's manager, then it may be restructured in a different way. These are examples only. Logic 238 generates control signals to guide the restructuring based on the intended recipient.

The transformations or restructuring can be performed based upon the analysis results generated by related content analysis logic 226. This is indicated by block 322 in the flow diagram of FIG. 4. For instance, if logic 226 identifies that relatively large number of recent documents created by user 116 have to do with a certain subject matter content, and represent that subject matter content using a particular set of graphics, then it may generate control signals to preferentially choose to restructure the current content being ingested using those types of graphics as well. This is just one example.

The prior customization transformation logic 236 illustratively generates control signals to restructure the content, while considering prior customizations made by user 116 to other ingested content. For instance, if user 116 has often customized the ingested content by changing bar charts into pie charts, then prior customization transformation logic 236 illustratively preferentially restructures graphic information according to bar charts. Performing the restructuring based on prior customizations by the user is indicated by block 324 in the flow diagram of FIG. 4.

Form factor transformation logic 240 generates control signals to perform restructuring based on the form factor for which the currently generated content is intended. For instance, if it is intended for a mobile device, then it may be restructured in one way, while if it is intended for a large screen device, it may be restructured in another way. Restructuring the content based on layout and form factor information is indicated by block 326.

It will be appreciated that the other transformation logic 242 can generate control signals to transform or restructure the content being ingested according to any of the analysis results discussed above. For instance, where a graph is being generated, the axes on the graph may represent the two most important items identified during analysis. This is just one example, and other transformation logic 242 can generate the transformations based on the analysis results, as well as a wide variety of other criteria. This is indicated by blocks 328 and 330, respectively, in FIG. 4.

It will be noted that restructuring system 228 can include the different portions of transformation logic as separate, discrete, items of logic or they can be incorporated into a single restructuring model or artificial intelligence component. If they are separate portions of logic, the control signals are combined to restructure the content.

At some point, link generator logic 184 generates and stores a link to the source of the ingested content. This is indicated by block 332 in the flow diagram of FIG. 4. This can be done in a number of different ways. For instance, it can identify the location of the file from which the ingested content was obtained. It can also identify the particular parts of the ingested content which were actually ingested (such as which charts, which portions of a word processing document, which tables in a spreadsheet, which slides in a slide presentation, and which pieces of those slides, etc. were actually ingested). The link can then be used when refreshing the ingested content or in other ways.

Restructured output generator logic 232 then generates an output indicative of the restructured content, in the current content generation application (in the application that is being used by user 116 to generate the current content). This is indicated by block 334 in the flow diagram of FIG. 4.

User interface logic 150 is then used to display the restructured content, using the content generation application. This is indicated by block 336. At the same time, conversational UI logic 180, and feedback logic 204, generate a conversational user interface display that requests user feedback on the restructured content. This is indicated by block 338.

It may be that the user is satisfied with the restructured content. However, it may be that the user also wishes to make changes to the restructured content. If the latter is true, then user change identifier logic 214 detects any user changes to the restructured content, and user change save logic 216 saves those changes (as deltas or differences) from the restructured content. That is, the restructured content is maintained as it was generated by system 158, and the changes to that restructured content, that are made by user 116, are saved separately so that they can be applied later, when the restructured content is rendered or refreshed. Detecting the user changes is indicated by block 340 and saving those changes separately from the restructured content is indicated by block 342.

At this point in the processing, the content to be ingested from the source document is now fully ingested and restructured according to the application that is being used to generate the current content. The restructured content is now restructured using the semantics of the application it is ingested into, and it can thus be saved or shared, etc. This is indicated by block 344 in the flow diagram of FIG. 4. By way of example, user 116 can use electronic mail computing system 108 to share the document containing the restructured content. User 116 can use social network computing system 110 to share it or other communication systems 112 as well.

At some point, it may be that the document containing the restructured content is to be refreshed. Refresh trigger detection logic 250 (shown in FIG. 3) thus detects a refresh trigger. This is indicated by block 346. The refresh trigger can take a wide variety of different forms. For instance, it may be that conversational UI logic 180 intermittently asks the user 116 whether he or she wishes to have the document refreshed. This is indicated by block 348. It may be that user 116 provides an input requesting that the content be refreshed, regardless of whether the user is prompted for that input. This is indicated by block 350. It may be that logic 250 receives an indication from the application, that was used to create the source document, indicating that the source document has been changed or revised. This may trigger a refresh of the restructured content. Detecting, as a refresh trigger, a change to the source document is indicated by block 352. It may also be that refresh logic 160 is scheduled to intermittently refresh the document according to a schedule. Detecting that it is time for a scheduled refresh is indicated by block 354. Refresh trigger detection logic 250 can detect triggers in a wide variety of other was as well, and this is indicated by block 356.

Once the trigger is detected, ingested source identifier logic 252 identifies the source of the ingested content that is to be refreshed. It may be that certain parts of a document come from one source while other parts come from another source. Thus, it may be that all of the ingested content in a given document is to be refreshed every time the document is to be refreshed. On the other hand, it may be that only certain parts of the document are to be refreshed. For instance, it may be that a user requests that a certain graph be refreshed. Identifying the source of ingested content to be refreshed is indicated by block 358. Identifying the source of all ingested content is indicated by block 360. Identifying the source of a subset of the ingested content is indicated by block 362. The source of the ingested content to be refreshed can be identified in other ways as well, and this is indicated by block 364.

Link identifier logic 254 then obtains and uses the link to the source content, in order to obtain access to the source document. This is indicated by block 366. For instance, it may be that link identifier logic 254 identifies a path that leads to the source document, and link following logic 256 navigates using that path to obtain access to the source document.

Source change identifier logic 258 then detects whether any changes have been made to the content that was ingested from the source document. This is indicated by block 368. If so, it identifies those changes and transformation logic interaction system 260 provides those changes to the application-specific transformation logic 186 which performs a transformation or restructuring on the refreshed content to obtain refreshed, restructured content. This is indicated by block 370.

User change application logic 262 then applies any of the user changes (that were saved by user change save logic 216) to the refreshed, restructured content. This is indicated by block 372. Because the user changes are saved separately from the underlying restructured content, then the refreshed content can be restructured in the same way as the underlying restructured content and the user changes can then be applied to that refreshed content.

The refreshed, restructured content, with the user deltas applied is then output as desired. This is indicated by block 374. It can be output to a data store, where it saved. This is indicated by block 376. It can be displayed to user 116, as indicated by block 378. It can be output to one or more different remote systems or in a wide variety of other ways as well, and this is indicated by block 380.

Figure 5A:
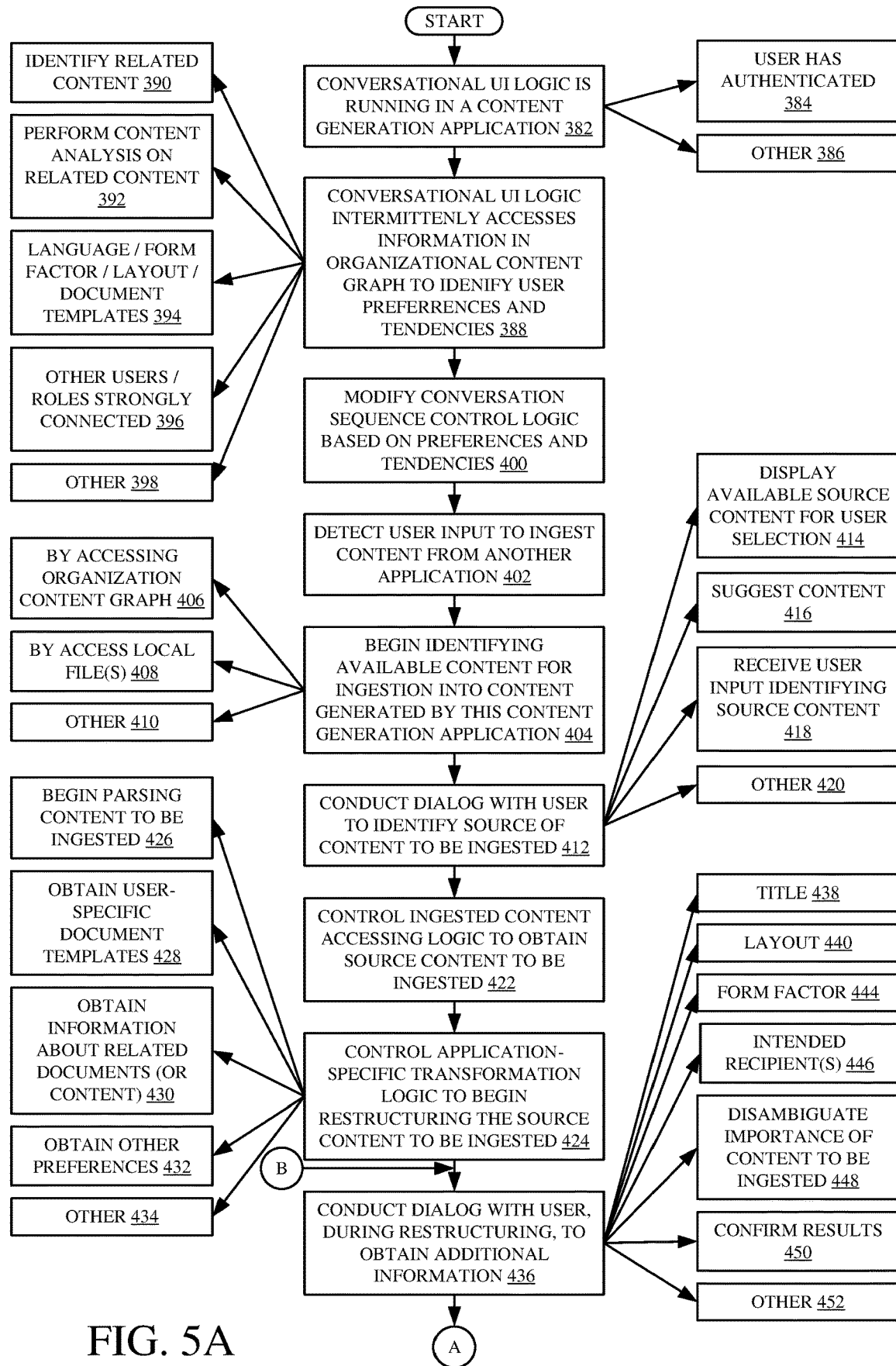
FIGS. 5A-5C (herein after referred to as FIG. 5) illustrates a flow diagram showing one example of the operation of a set of conversational user interface logic in conducting a dialog with a user and controlling content ingestion.
Figure 5B:
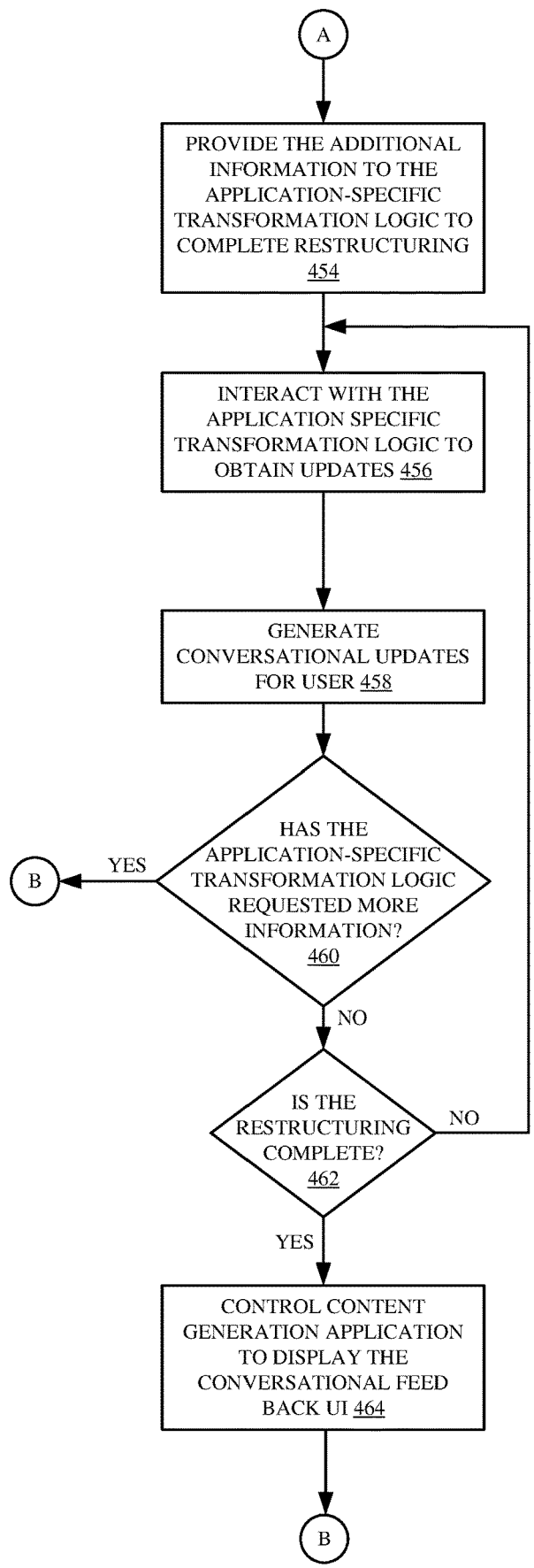
Figure 5C:
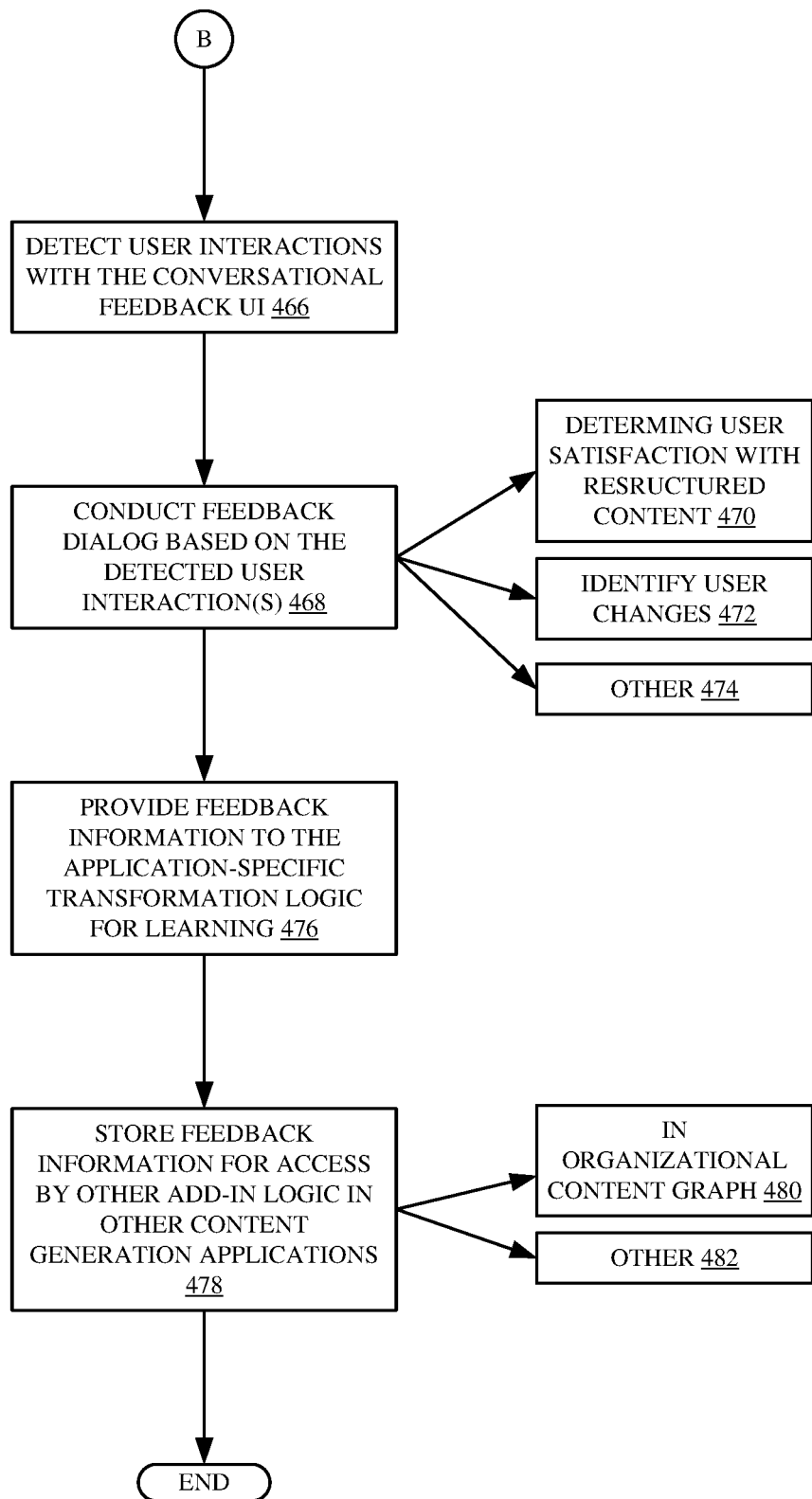

FIGS. 5A-5C (collectively referred to herein as FIG. 5) show a flow diagram illustrating one example of the operation of conversational UI logic 180 in more detail. It is assumed that the conversational UI logic 180 is running in a content generation application that is being used by user 116 to generate content. This is indicated by block 382 in the flow diagram of FIG. 5. It is assumed that the user has logged into, or otherwise authenticated to, the content generation application, or to the system that is running it, hosting it, etc. This is indicated by block 384. The content generation application may be running with the conversational UI logic in other ways as well, and this is indicated by block 386.

In one example, preference identifier logic 194 intermittently uses organizational content graph accessing logic 208 to access information in the organizational content graph maintained by computing system 104 to identify user preferences, user tendencies, etc. This is indicated by block 388 in the flow diagram of FIG. 5. By way of example, it may be that logic 194 identifies content that is created or accessed by user 116, as related content. It may identify related content as content that was shared with the user, or in other ways. Identifying related content is indicated by block 390. Logic 194 may perform analysis (or have that analysis performed by another logic component) on the related content as well. This operation may be performed in the background to maintain various analysis results, of interest, on the related content corresponding to user 116. This is indicated by block 392. Logic 194 may identify the language, form factor, layout, document templates, and other preferences of user 116 based upon the various analyses performed. This is indicated by block 394. Logic 194 may identify other users or roles that are strongly connected to user 116 in the organizational content graph. This is indicated by block 396. Logic 194 can perform other analysis (or have that analysis performed) intermittently, in the background, to identify related content, and various preferences and tendencies of user 116 in other ways as well. This is indicated by block 398.

Based upon the information that is learned about user 116, conversational sequence and control logic 196 modifies rules or models that determine the conversational sequence control based upon the preferences and tendencies. This is indicated by block 400 in FIG. 5. For instance, it may be that logic 180 contains a model or heuristics or other logic that defines the sequence and control of the conversational UI that it generates with each different user. By maintaining some analysis results indicative of the user preferences and tendencies from the organizational content graph (or from another source) those rules can continually or intermittently be revised and updated.

Content ingestion trigger detection logic 191, at some point, detects a user input that indicates that the user wishes to ingest content from another application, into the presently running content generation application. This is indicated by block 402. By way of example, it may be that user 116 is currently generating a word processing document, using a word processing application, but that user 116 wishes to ingest content from another document generated using a different content generation application. This is just one example.

Available content identifier logic 192 then begins identifying available content for ingestion into the content generated by this content generation application. This is indicated by block 404. By way of example, it may be that user 116 only has access to (or permission rights to) certain content. It may be that the user has worked on some documents more recently or more often than other documents. It may be that an importance of the documents related to user 116 have been identified using the weighted relationships in the organizational content graph or when identifying user preferences (as discussed above at block 388). In that case, available content identifier logic 192 may identify all of the documents with ingestible content that user 116 has access to, and rank them in order of importance or in order of likelihood that the user will be ingesting content from those documents. The ranking criteria can, as discussed, be the recency of access by user 116, the weight of the relationship between user 116 and the content, the frequency of access by user 116, the subject matter of the documents, and/or the importance of those documents using other criteria, etc. In identifying source documents with ingestible content, logic 192 may access the organizational content graph maintained by computing system 104. This is indicated by block 406. It may access the local files 154. This is indicated by block 408. It may identify ingestible content in other ways as well, and this is indicated by block 410.

Conversation sequence and control logic 196 then conducts a conversational dialog with user 116 to have user 116 identify the source document for the content to be ingested. This is indicated by block 412. In one example, logic 196 can display available source content for user selection. This is indicated by block 414. In another example, ingested content identifier logic 200 can suggest content to be ingested by various different source documents. This is indicated by block 416. The suggestion may be based on the importance criteria discussed above, or other criteria.

In yet another example, ingested content identifier logic 200 receives a user input identifying the source content (such as the user typing a document location in a text box, in a search box, etc.). This is indicated by block 418. Logic 200 can generate a dialog with user 116 to have user 116 identify the source document that contains the content to be ingested in other ways as well, and this is indicated by block 420. It will be noted that the selection of ingestible content can include selecting particular parts of a source document, selecting a source document as a whole, or other identifying techniques.

Ingested content identifier logic 200 then controls ingested content accessing logic 182 to obtain the source of the content to be ingested. This is indicated by block 422 in the flow diagram of FIG. 5. In doing so, it can use organizational content graph accessing logic 208 to access content on the organizational content graph maintained by computing system 104. It can use local content accessing logic 210 to access local files 154, or it can obtain the source of the content to be ingested in other ways.

Conversational UI logic 180 then controls application-specific transformation logic 186 to begin restructuring the source content to be ingested. This is indicated by block 424 in the flow diagram of FIG. 5. For instance, logic 186 uses ingested content parsing logic 220 to begin parsing the content to be ingested, as indicated by block 426. It obtains user-specific document templates (and other user preferences) identified by preference identifier logic 194. This is indicated by block 428. It obtains information about related documents (or related content) as indicated by block 430. It obtains other preference information as well, as indicated by block 432. Conversational UI logic 180 can communicate with transformation logic 186 to begin transforming or restructuring the source content to be ingested in other ways as well, and this is indicated by block 434.

While logic 186 is restructuring the content to be ingested, conversational UI logic 180 continues to conduct a dialog with the user, to obtain additional information that can be used in the restructuring process. This is indicated by block 436. For instance, it can obtain a desired title 438 from user 116. It can ask user 116 to specify particular layout details 440 and form factor information 444. It can use recipient identifier logic 202 to have user 116 identify the intended recipients of the content, as indicated by block 446. It can disambiguate the importance of the content to be ingested, such as by asking the user which parts of the content are most important or in other ways. This is indicated by block 448. It can confirm various other restructuring results as indicated by block 450, and it can obtain additional information from the user in other ways as well, and this is indicated by block 452.

Conversational UI logic 180 can provide the additional information it has received from the user to the application-specific transformation logic 186 so that it can complete restructuring of the content to be ingested. This is indicated by block 454.

Logic 196 can also interact with the application-specific transformation logic 186 to obtain updates as to where logic 186 is in the restructuring process. This is indicated by block 456. It can then generate conversational updates for the user, indicating to the user what is happening in the restructuring process. This is indicated by block 458.

It may be that conversational UI interaction logic 230 in logic 186 interacts with conversational UI logic 180 in order to request conversational UI logic 180 to obtain additional information from the user. This is indicated by block 460. If so, processing reverts to block 436 where conversation sequence and control logic 196 executes a conversational sequence with user 116 to obtain the requested information.

If the restructuring is continuing, as indicated by block 462, processing reverts to block 456 where additional updates are provided to the user. However, once restructuring is complete, as indicated by block 462, then content generating application logic 140 controls the content generation application it is running to display the conversational feedback user interface generated by feedback logic 204. This is indicated by block 464. It will be appreciated that, at the same time, content generating application logic 140 will be controlling the content generation application to display the restructured, ingested content. Thus, user 116 can view the restructured content and provide appropriate feedback.

Feedback logic 204 detects user interactions with the conversational feedback user interface, as indicted by block 466. It conducts a feedback dialog with the user based upon the detected user interactions. This is indicated by block 468. For instance, it may determine the user satisfaction with the restructured content. This is indicated by block 470. It may provide the user an opportunity to make changes to the restructured content, and it can identify and track those changes using user modification tracking logic 188. This is indicated by block 472. It can conduct the feedback dialog based on the detected user interactions in a wide variety of other ways as well, and this is indicated by block 474.

Feedback logic 204 then interacts with conversational UI interaction logic 230 in transformation logic 186 to provide feedback information to the application-specific transformation logic 186. In one example, the ingested content analysis logic 222 (or other parts of analysis logic or restructuring system 228) uses the feedback information to learn how to analyze and restructure ingested content in better ways, in the future. Providing the feedback information to the application-specific transformation logic 186 for learning is indicated by block 476 in the flow diagram of FIG. 5.

The feedback information can then be stored for access by other add-in logic in other content generation applications. This is indicated by block 478. For instance, it can be stored in the organizational content graph along with preferences for user 116. This is indicated by block 480. It can be stored for access by other add-ins in other ways as well, and this is indicated by block 482.

Figure 6:
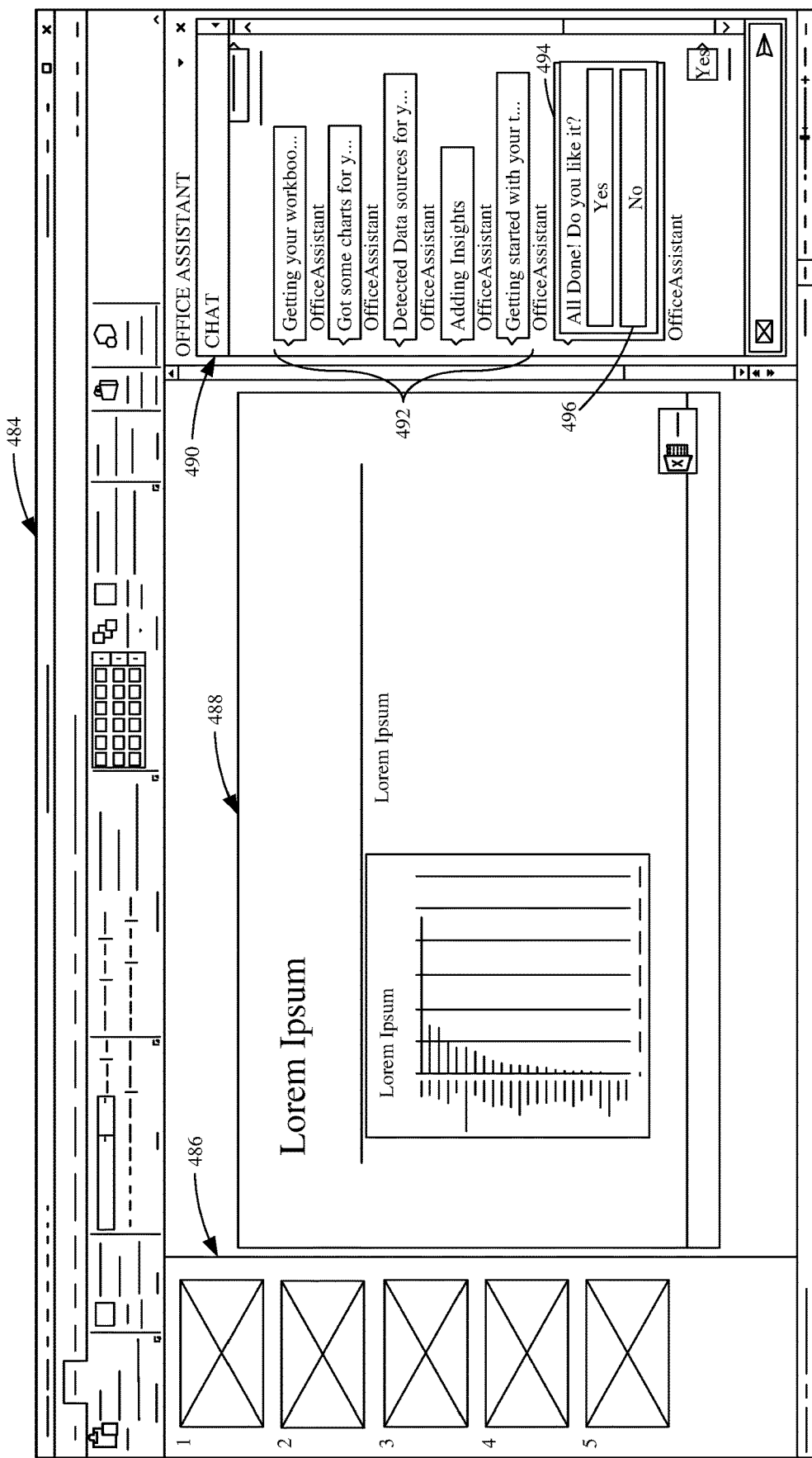
FIG. 6 shows one example of a user interface display that can be generated by the conversational UI logic.

FIG. 6 is an illustration of one example of a user interface display 484 that can be generated by content ingestion and transformation add-in logic 158. FIG. 484 shows that application-specific transformation logic 186 has already generated restructured content. In one example, the restructured content is a series of slides 486 generated in a slide presentation application. The user has selected one of the slides 488 for display. It can also be seen that conversational UI 180 has generated a conversational user interface dialog with user 116, and this is shown generally at 490.

By way of example, conversational sequence and control logic 196 has generated a series of update communications 492 that provide updates as to the status of application-specific transformation logic 186, in generating the restructured content. It then provides a feedback user interface display 494 that allows the user to indicate whether he or she is satisfied with the restructured content. If the user actuates the "no" actuator 496, then conversation sequence and control logic 196 controls the application to allow the user to make modifications to the restructured content. User modification tracking logic 188 tracks those changes so that they can be saved and applied to the restructured content, when it is refreshed.

Figure 7:
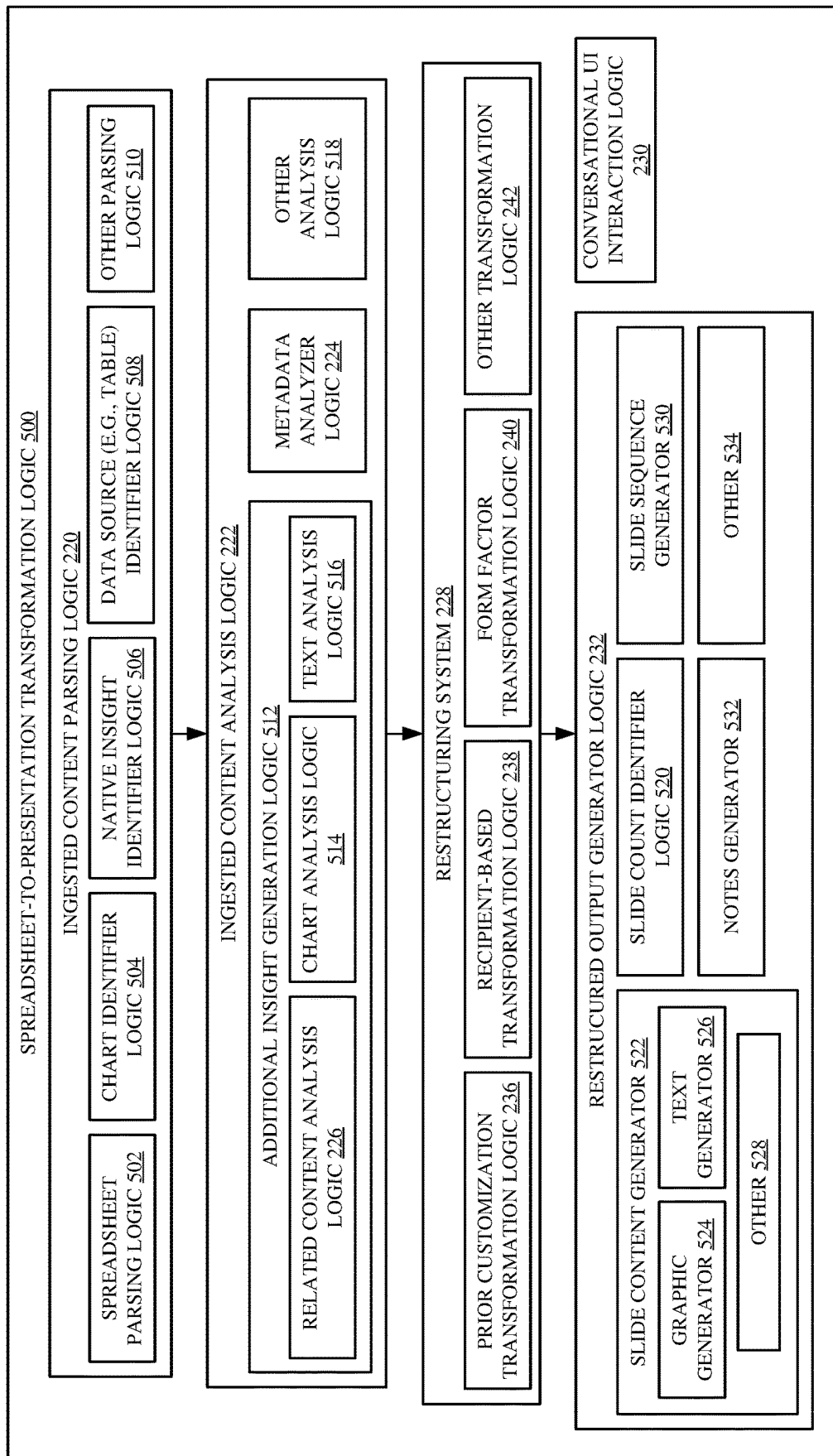
FIG. 7 is a block diagram showing one example of spreadsheet-to-presentation transformation logic.

FIG. 7 is a block diagram showing one example of a set of application-specific transformation logic 186 in more detail. In the example shown in FIG. 7, logic 186 is represented as spreadsheet-to-presentation transformation logic 500. Some of the items are similar to those shown in FIG. 2, and they are similarly numbered. In the example shown in FIG. 7, ingested content parsing logic 220 illustratively includes spreadsheet parsing logic 502, chart identifier logic 504, native insight identifier logic 506, data source (e.g., table) identifier logic 508, and it can include other parsing logic 510. Ingested content analysis logic 222 can include the metadata analyzer logic 224, additional insight generation logic 512, related content analysis logic 226, chart analysis logic 514, and text analysis logic 516. Ingested content analysis logic 222 can include other analysis logic 518 as well.

Restructured output generator logic 232 illustratively includes slide count identifier logic 520, slide content generator 522 (which, itself, illustratively includes graphic generator 524, text generator 526, and it can include other items 528). Restructured output generator logic 232 can include slide sequence generator 530, notes generator 532, and it can include other items 534.

Figure 8:
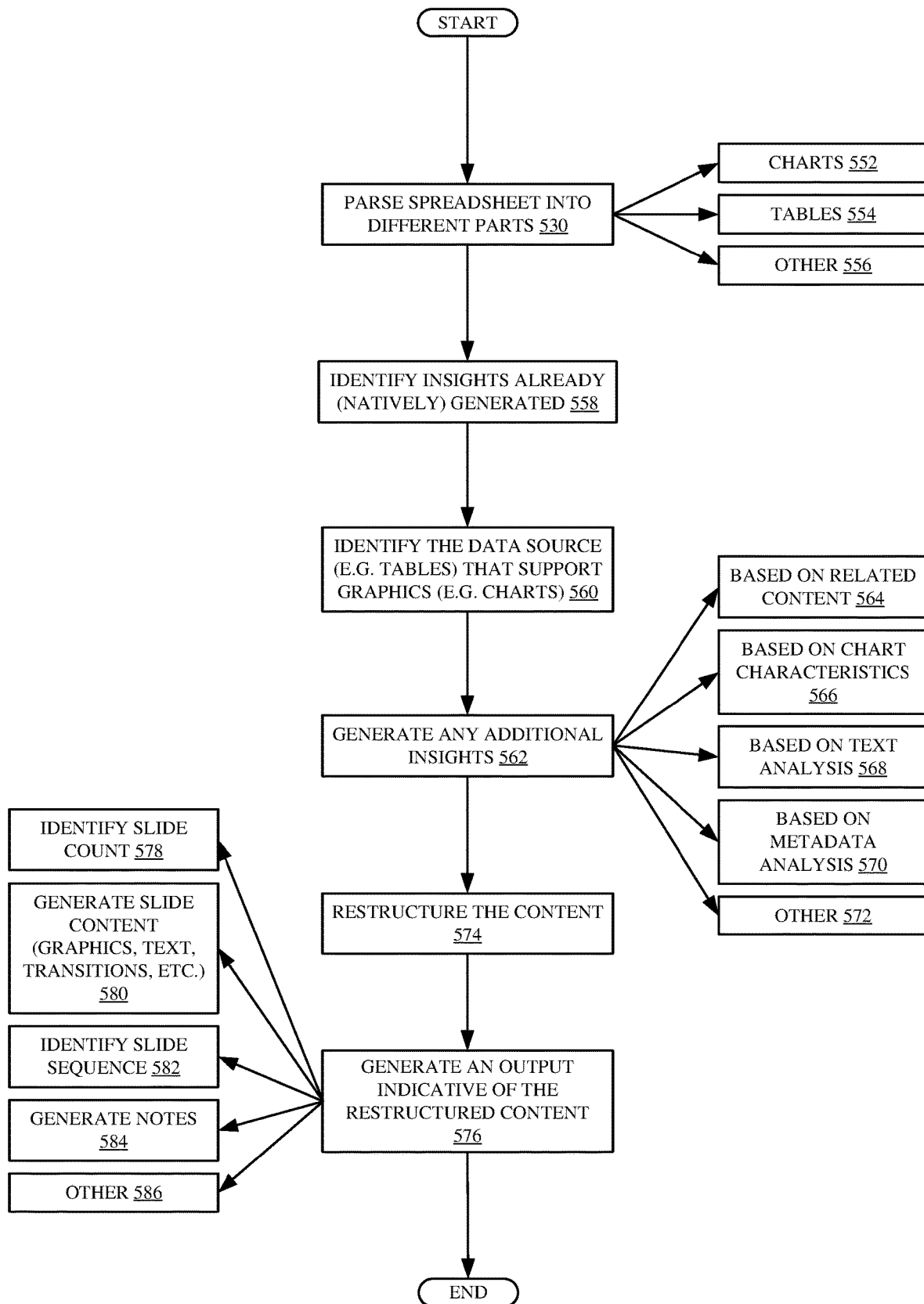
FIG. 8 is a flow diagram illustrating one example of the operation of the logic shown in FIG. 7.

FIG. 8 is a flow diagram illustrating one example of the operation of spreadsheet-to-presentation transformation logic 500 in restructuring content that resides in a spreadsheet document into ingested content that is ingested into a slide presentation document. Spreadsheet parsing logic 502 first parses the spreadsheet into its different parts. This is indicated by block 550 in the flow diagram of FIG. 8. For instance, chart identifier logic 504 can identify charts 552, tables 554 and a wide variety of other items 556 in the spreadsheet document. Native insight identifier logic 506 identifies insights that have already been generated by the spreadsheet application used to generate the spreadsheet document. For instance, some spreadsheet applications analyze data in a spreadsheet document and generate insights indicative of relationships, patterns, correlations among different graphics, etc. These insights are identified by native insight identifier logic 506, and this is indicted by block 558.

Data source identifier logic 508 illustratively identifies the data sources for the various graphic elements. For instance, where a chart 552 is identified in the spreadsheet document, the data used to generate that chart may come from one or more different tables in the spreadsheet document. Thus, the data source (e.g., the tables) that support the graphic (e.g., the chart) are identified. This is indicated by block 560.

Additional insight generation logic 512 then generates any additional insights. This is indicated by block 562. Related content analysis logic 226 can generate those insights based on external data, such as related documents discussed above. This is indicated by block 464. Chart analysis logic 514 can generate additional insights based upon the characteristics of the different charts or graphics identified in the spreadsheet document. This is indicated by block 566. For instance, if a chart has an x-axis and a y-axis, then the information (or variable) represented on those axes may be identified as being important to the user who created the spreadsheet document. Thus, that information may be used in restructuring the content of the document. It can also generate a relevance metric indicative of a relevance of information in the chart to the document being created. The same can be done for pivot charts, or pivot tables, tables, and their underlying data sources. The relevancy and importance level can be generated from all data and metadata used on the restructuring.

There may be textual information in the chart or tables or in the spreadsheet in other places. Text analysis logic 516 can perform a natural language analysis of that text to generate additional insights, and this is indicated by block 568. Metadata analyzer logic 224 can use the metadata corresponding to the spreadsheet document (such as the author, the date it was created, the date it was last accessed or updated, etc.) to generate additional insights as well, and this indicated by block 570. Additional insights can be generated in a wide variety of other ways as well, and this is indicted by block 572.

Restructuring system 228 then restructures the content for ingestion into the slide presentation document. This is indicated by block 574. In doing so, it can incorporate the way that information is represented in the slide presentation document in the restructuring process. It can use prior customizations in logic 236, the identified recipients in logic 238, the intended form factor in logic 240, and it can restructure the document in a wide variety of other ways using logic 242. For instance, logic 242 can include insight conversation logic that converts the natively generated insights, or additional insights, to a graphic or textual description of the insights.

Restructured output generator logic 232 then generates an output indicative of the restructured content. This is indicated by block 576. By way of example, slide count identifier logic 520 may identify a preferred slide count (e.g., the number of slides in the slide presentation that will represent the ingested content). This is indicated by block 578. Slide content generator 522 then generates the content for those slides. Graphic generator 524 can generate graphics. Text generator 526 can generate text for the slides, among other things. This is indicated by block 580 in the flow diagram of FIG. 8. Slide sequence generator 530 illustratively identifies a slide sequence for the slides, and transitions, based upon their content. This is indicated by block 582. Notes generator 532 illustratively generates notes that can accompany the slides. This is indicated by block 584. The output can be generated in a wide variety of other ways as well, and this is indicated by block 586.

Figure 9:
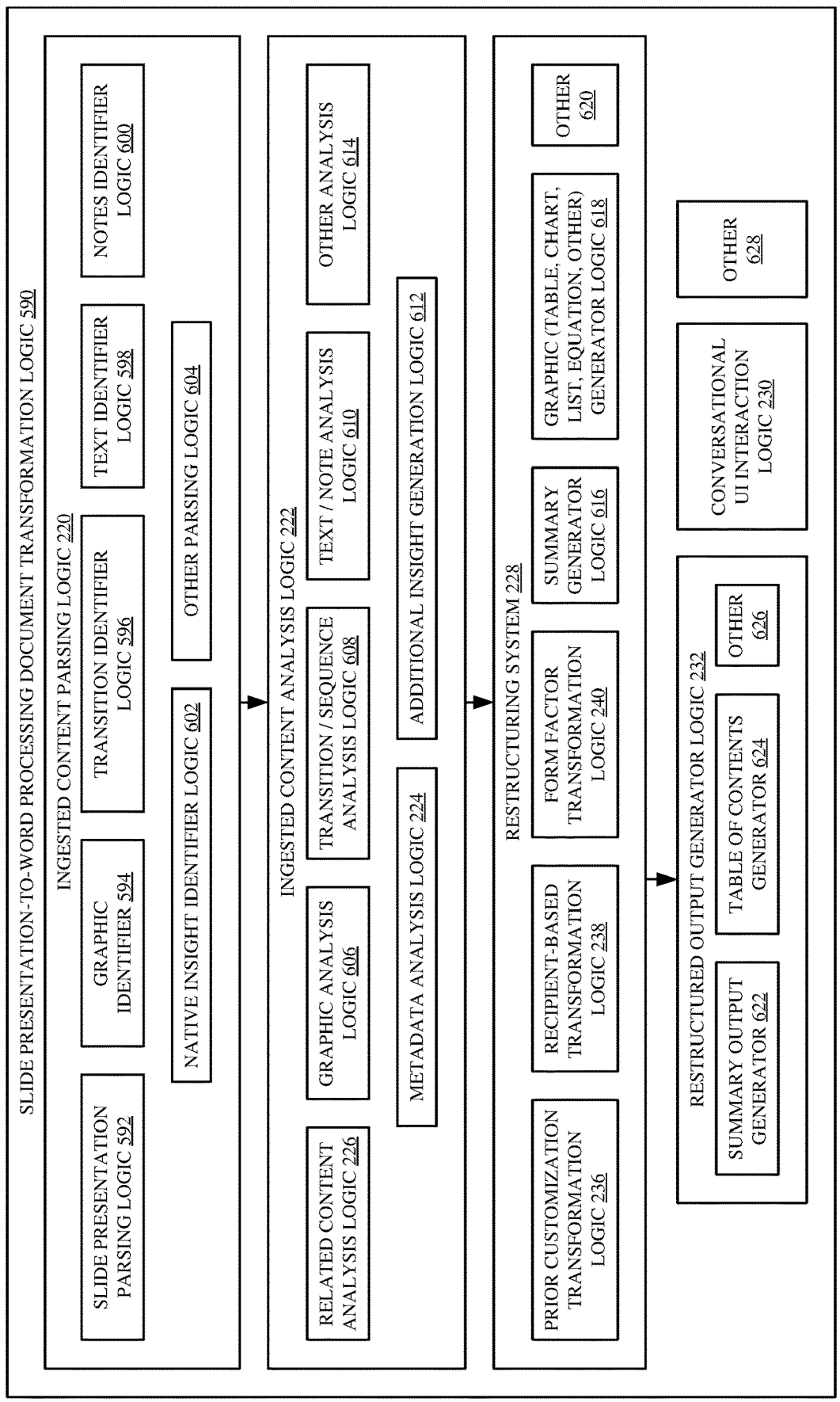
FIG. 9 is a block diagram showing one example of presentation-to-word processing transformation logic.

FIG. 9 is a block diagram showing another example of application-specific transformation logic 186. In the example shown in FIG. 9, it is described as slide presentation-to-word processing document transformation logic 590. Some of the items in logic 590 are similar to those shown in FIG. 2 (for logic 186), and they are similarly numbered. Thus, transformation logic 590 includes ingested content processing logic 220 that processes a slide presentation so that its contents can be ingested into a word processing document. In the example shown in FIG. 9, logic 220 includes slide presentation parsing logic 592, graphic identifier 594, transition identifier 596, text identifier 598, notes identifier logic 600, native insight identifier logic 602 and it can include other parsing logic 604. Ingested content analysis logic 222 can include related content analysis logic 226 and metadata analysis logic 224. It can include graphic analysis logic 606, transition/sequence analysis logic 608, text/note analysis logic 610, additional insight generation logic 612, and it can include other analysis logic 614.

Restructuring system 228 can include prior customization transformation logic 236, recipient-based transformation logic 238, form factor transformation logic 240, summary generator logic 616, graphic (table, chart, list, equation, other) generator logic 618, and it can include other restructuring logic 620. Restructured output generator logic 232 illustratively includes summary output generator 622, table of contents generator 624, and it can include other items 626. Logic 590 can also include conversational UI interaction logic 230 or other items 628.

Figure 10:
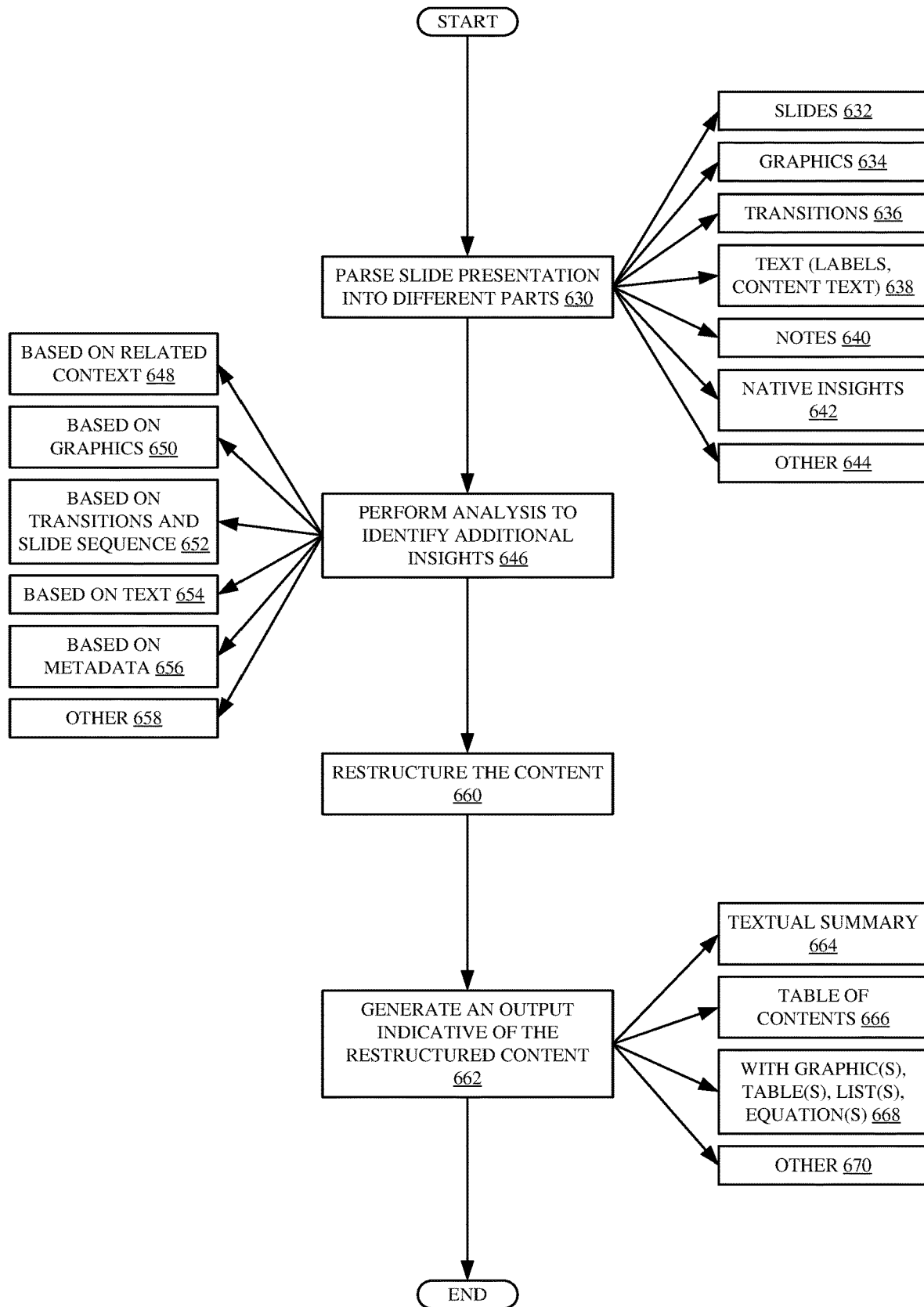
FIG. 10 is a flow diagram illustrating one example of the operation of the logic illustrated in FIG. 9.

FIG. 10 is a flow diagram illustrating one example of the operation of slide presentation-to-word processing document transformation logic 590 in restructuring content found in a source slide presentation document so that it can be included in a word processing document. Slide presentation parsing logic 592 first parses the slide presentation into it's different parts. This is indicated by block 630 in the flow diagram of FIG. 10. It illustratively parses the slide presentation into different parts that can be recognized by the various items shown in logic 200. Thus, it first parses the slide presentation document into different slides 632. Graphic identifier 594 identifies different graphics 634 on those slides, along with metadata corresponding to those graphics, and transition identifier logic 596 identifies the transitions 636 between the different slides. Text identifier logic 598 identifies the text (such as labels and content text and bullet points, etc.) on the slides, as indicted by blocks 638. Notes identifier logic 600 identifies the notes 640 corresponding to the slides and native insight identifier logic 602 identifies any native insights 642 that may have been generated by the slide presentation logic. A wide variety of other items in the slide presentation document can be identified as well, and this is indicated by block 644.

Ingested content analysis logic 222 than performs analysis on the various parts that have been parsed out of the document to identify any additional insights. This is indicated by block 646. It will be noted that the additional insights can also be based on related content and be generated by related content analysis logic 226. This is indicated by block 648 in the flow diagram of FIG. 10. The additional insights can be generated from graphic analysis logic 606 based on the graphics found in the slides. This is indicated by block 650. The additional insights can also be generated by transition/sequence analysis logic 608 based on the transitions and slide sequence in the slide presentation document. This is indicated by block 652. By way of example, it may be that two consecutive slides are the same except for one textual bullet point that was added to the second slide, in addition to those shown in the first slide. In that case, the transition/sequence analyzer logic 608 may identify an insight indicating that the information should be presented as a series of steps, in the word processing document. This is just one example. Further, different items of smart art may provide different insights.

The text/note analysis logic 610 may provide additional insights based upon the text, notes, bullet points, etc. in the slides. This is indicated by block 654. Metadata analysis logic 224 may provide additional insights based upon the metadata in the slide presentation document. This is indicated by block 656. For instance, the metadata corresponding to the slides may have label information that identifies labels or there may be labeled sections of the presentation. Those different sections may be identified as candidates for placing in a table of contents in the word processing document. This is just one example of how additional insights can be generated based on metadata. The metadata analysis logic 224 can also generate a relevance metric indicative of a relevance of the information in the metadata to the document being generated. Restructuring system 228 can restructure the content based on the relevance metric or in other ways, some of which are described below.

The additional insights can be generated in a wide variety of other ways as well. This is indicated by block 658. As mentioned above, the additional insights and analysis results can indicate an importance or relevance of the various parts of the source document, relationship or correlations or patterns in the content, ways to transform or restructure the content, among other things.

Restructuring system 228 then restructures the content found in the slide presentation document so that it can be provided in the word processing document. This is indicated by block 660. As is described above, the restructuring can be performed based on prior customizations using prior customization transformation logic 236. It can be performed based upon the intended recipient of the word processing document, as represented by recipient-based transformation logic 238. The restructuring can be performed based upon the intended form factor on which the word document will be displayed using form factor transformation logic 240. In addition, however, summary generator logic 616 can generate a textual summary of the ingested content. By way of example, it may be that the user has selected the entire slide presentation for ingestion. On the other hand, it may be that the user has only selected a subset of the slides in the presentation to be ingested. Summary generator logic 616 generates a summary of the content to be ingested, based upon the analysis results described above. The summary generator may, for instance, generate a reformatted representation of a graphical text object ingested from the slide presentation. This is just one example.

Graphic (table, chart, list, equation, other) generator logic 618 can also generate graphics for inclusion in the word processing document. The graphics can include tables or charts. They can include lists in various forms, equations, or other graphic information. Once the content has been restructured so that it can be used in the word processing document, the restructured output generator logic 232 generates an output indicative of the restructured content. This is indicated by block 662.

By way of example, summary output generator 222 generates an output indicative of the textual summary 664. Table of contents generator 624 generates an output indicative of any table of contents 666 that was generated. Various other portions of restructured output generator logic 232 can generate the output with graphics, tables, lists, equations, etc. This is indicated by block 668. The output indicative of the restructured content can be generated in a wide variety of other ways as well, and this is indicated by block 670.

It can thus be seen that the present description improves whatever computing system it is included in. When it is included in a computing system that runs a content generation application, the add-in allows the computing system to quickly perform an analysis on content to be ingested and then restructure the content according to any content generation rules, techniques, or mechanisms that are used in the content generation application that is ingesting the content. It can take a document generated using a different content generation application, identify important parts in that document, generate additional insights even including insights obtained from external information (such as other documents, user preferences, etc.) and restructure the content so that it can be displayed in the current content generation application. This greatly enhances the functionality of the computing system that runs the content generation application.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
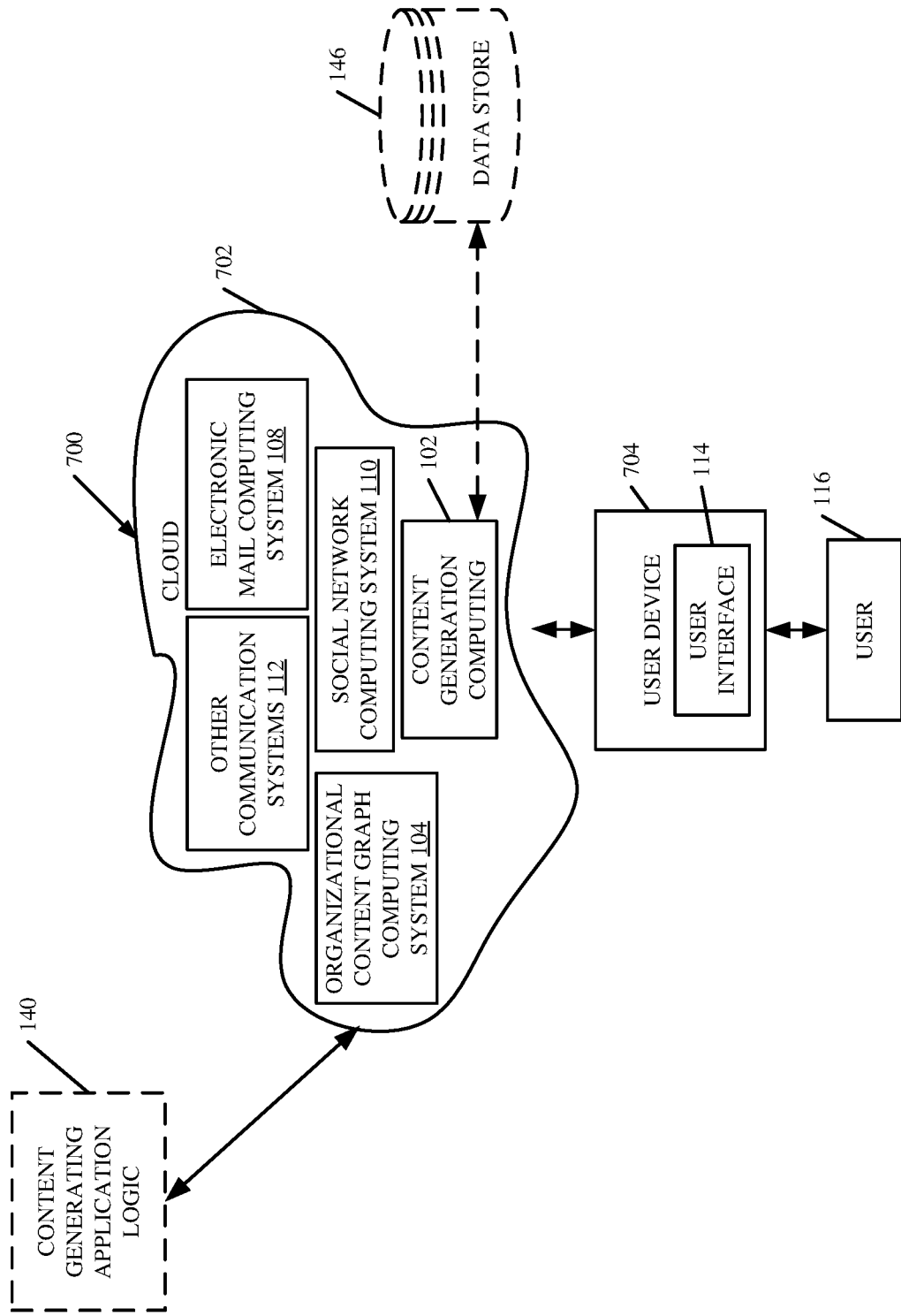
FIG. 11 is a block diagram showing one example of the architecture illustrated in FIG. 1, deployed in a could computing architecture.

FIG. 11 is a block diagram of architecture 100, shown in FIG. 1, except that its elements are disposed in a cloud computing architecture 700. Cloud computing provides computation, software, data access, and storage services that do not require end-user knowledge of the physical location or configuration of the system that delivers the services. In various examples cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 11, some items are similar to those shown in FIG. 1 and they are similarly numbered. FIG. 11 specifically shows that computing systems 102, 104, 108, 110, and 112 can be located in cloud 702 (which can be public, private, or a combination where portions are public while others are private). Therefore, user 116 uses a user device 704 to access those systems through cloud 702.

FIG. 11 also depicts another example of a cloud architecture. FIG. 11 shows that it is also contemplated that some elements of architecture 100 can be disposed in cloud 702 while others are not. By way of example, data store 146 can be disposed outside of cloud 702, and accessed through cloud 702. In another example, content generating application logic 140 can also be outside of cloud 702. Regardless of where they are located, they can be accessed directly by device 704, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
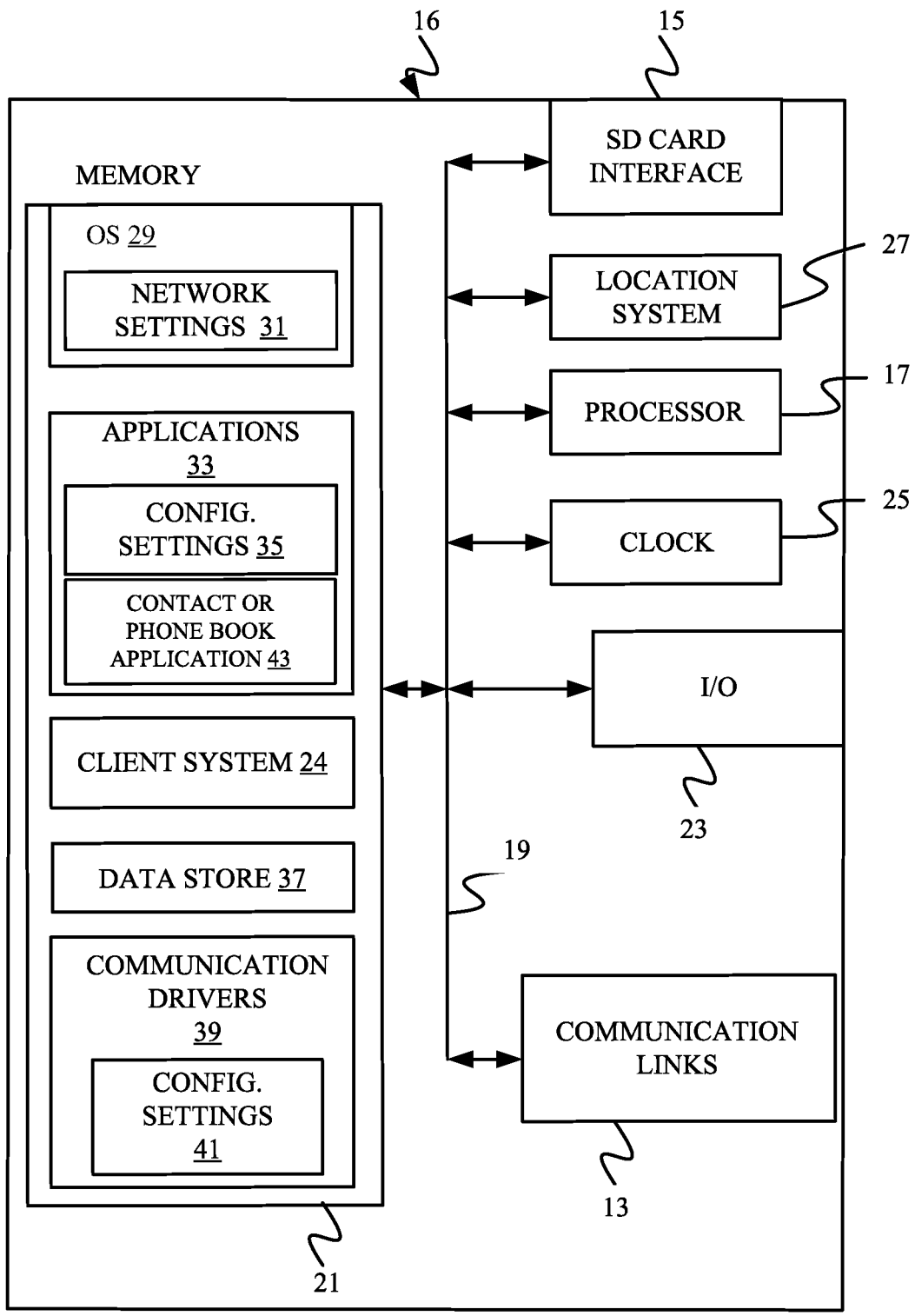
FIGS. 12-14 show examples of mobile devices that can be used in the architectures shown in the previous FIGS.
Figure 13:
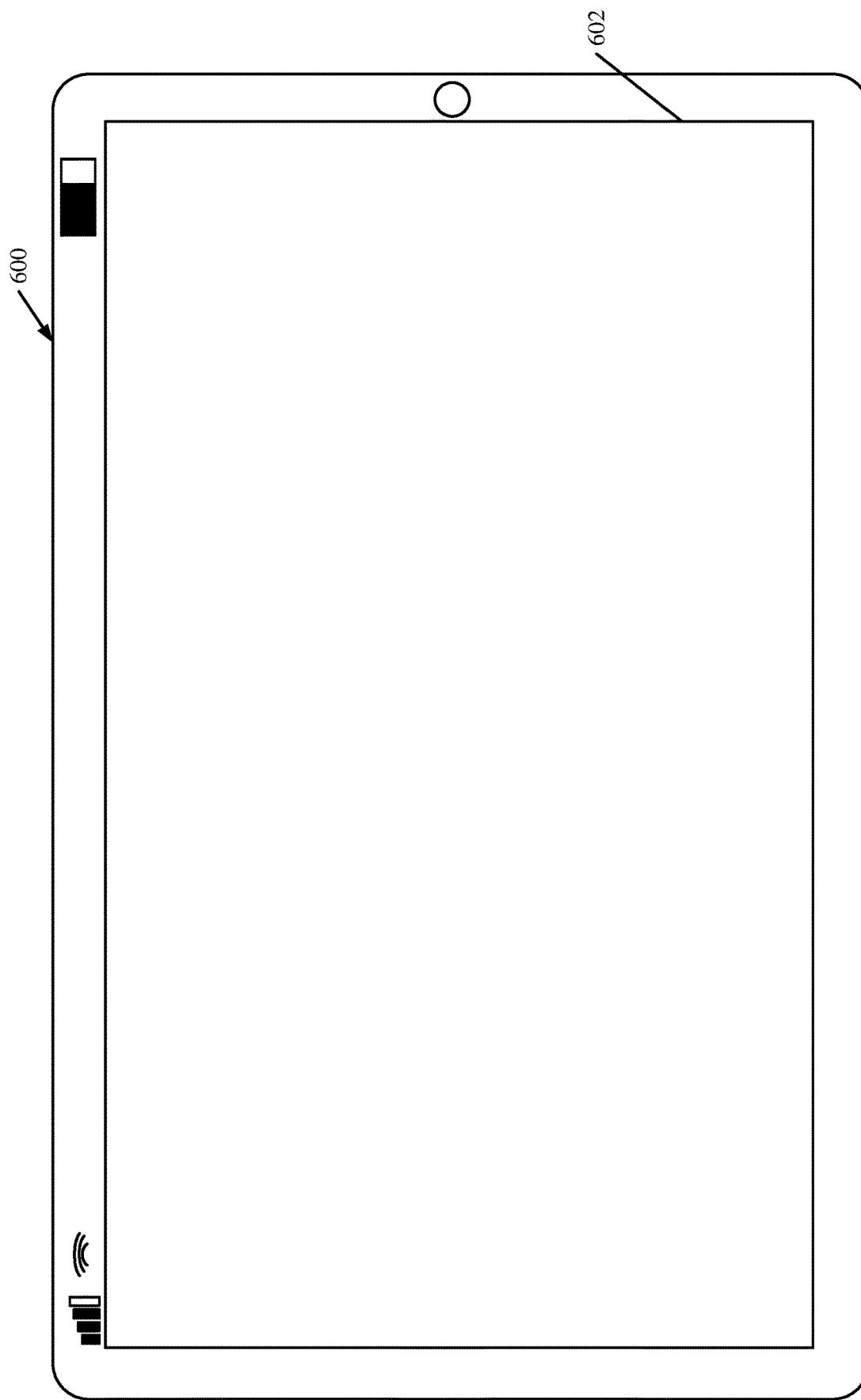
Figure 14:
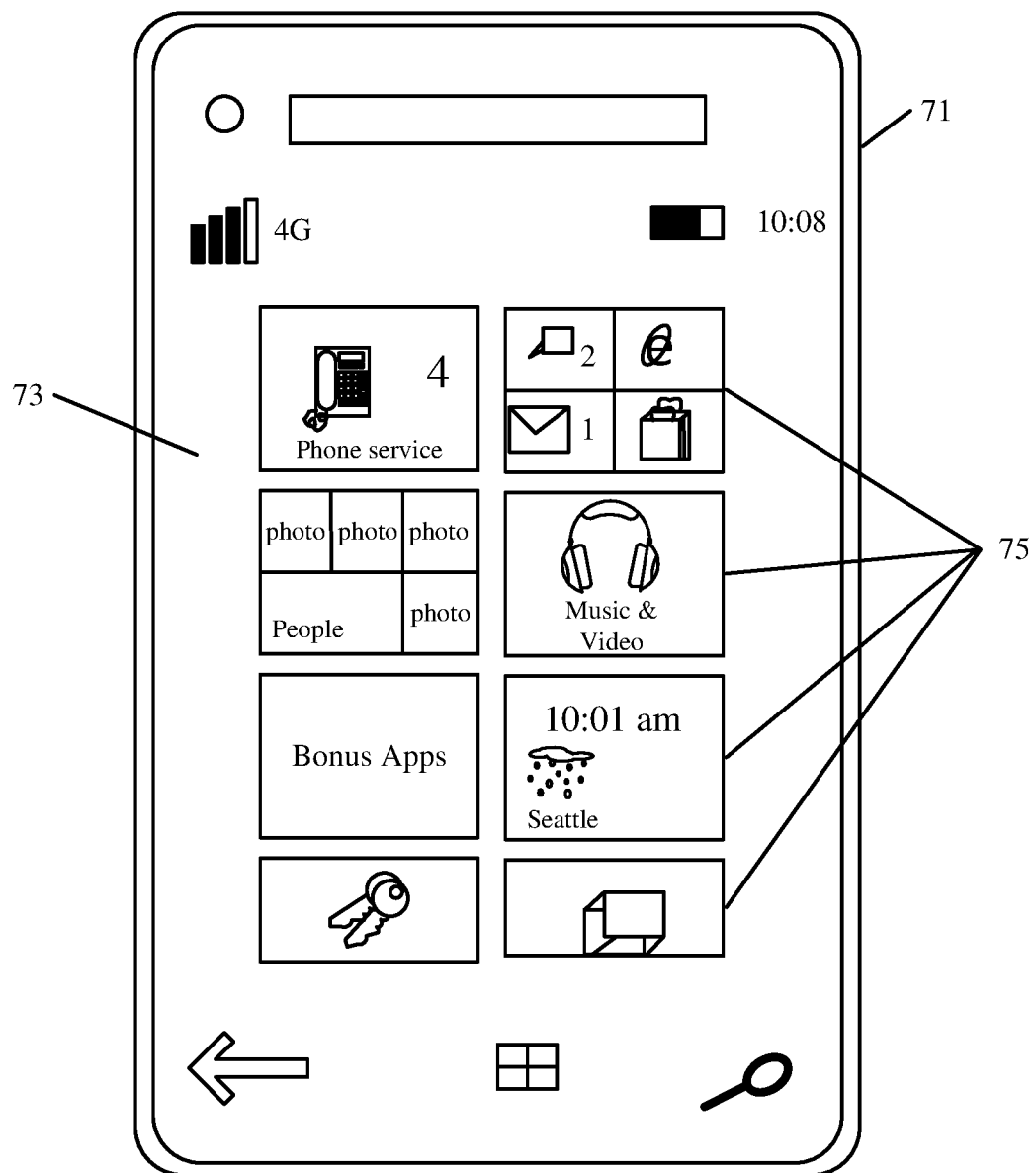

FIG. 12 is a simplified block diagram of one illustrative example of a handheld or mobile computing device that can be used as a user's or client's hand held device 16, in which the present system (or parts of it) can be deployed. FIGS. 13-14 are examples of handheld or mobile devices.

FIG. 12 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as 802.11 and 802.11b (Wi-Fi) protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors from previous FIGS) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 13 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
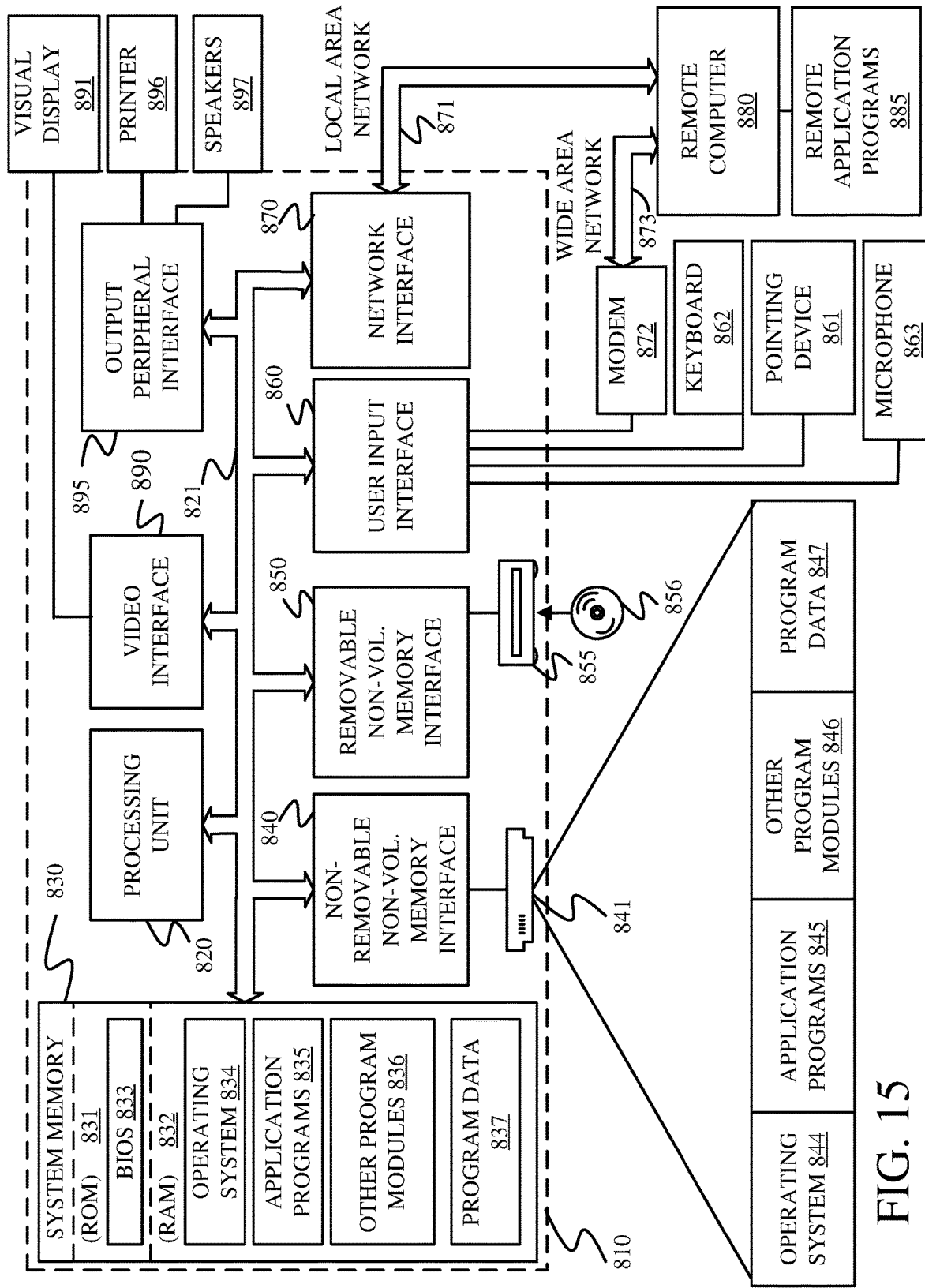
FIG. 15 is a block diagram showing one example of a computing environment that can be used in the architectures shown in the previous FIGS.

FIG. 15 is one example of a computing environment in which architecture 100, or parts of it, (for example) can be deployed. With reference to FIG. 15, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 15.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 15 illustrates operating system 834, application programs 835, other program modules 836, and program data 837.

The computer 810 may also include other removable/non-removable volatile/nonvolatile computer storage media. By way of example only, FIG. 15 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 810. In FIG. 15, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 15 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 15 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
a processor;
content generating application logic that uses the processor to run a first content generation application to generate a first document; and
slide presentation content ingestion and transformation logic, that identifies a graphical object in slide presentation content in a source slide presentation document, generated using a slide presentation application, different from the first content generation application, for ingestion into the first document and that automatically restructures the graphical object in the slide presentation content into restructured content that is displayed, by the first content generation application, in the first document.

Example 2 is the computing system of any or all previous examples wherein the slide presentation content ingestion and transformation logic, comprises:
graphic analysis logic configured to identify the graphical object, with corresponding metadata, on a slide in the slide presentation content; and
metadata analysis logic configured to identify label information in the metadata corresponding to the graphical object.

Example 3 is the computing system of any or all previous examples wherein the slide presentation content ingestion and transformation logic, comprises:
summary generator logic configured to generate a textual summary corresponding to the graphical object based on the label information.

Example 4 is the computing system of any or all previous examples wherein the graphical object comprises a graphical text object and wherein the summary generator logic is configured restructure the graphical text object by generating a reformatted representation of the graphical text object.

Example 5 is the computing system of any or all previous examples wherein the slide presentation content ingestion and transformation logic, comprises:
slide presentation parsing logic configured to identify different slides and a slide sequence in the slide presentation content; and
sequence analysis logic configured to generate an order for information in the restructured content based on the slide presentation content on the different slides and based on the slide sequence.

Example 6 is the computing system of any or all previous examples wherein the slide presentation content ingestion and transformation logic, comprises:
transition identifier logic configured to identify types of transitions between the different slides; and
transition analysis logic configured to generate textual transitions in the restructured content based on the identified transitions.

Example 7 is the computing system of any or all previous examples and further comprising:
link generator logic that generates, as metadata for the first document, a link to the slide presentation content in the source slide presentation document; and
refresh logic configured to use the link to the slide presentation content to refresh the restructured content based on changes to the slide presentation content in the source slide presentation document.

Example 8 is the computing system of any or all previous examples wherein the metadata analysis logic is configured to generate a relevance metric indicative of a relevance of the data represented by the label information in the metadata to the first document, and wherein the slide presentation content ingestion and transformation logic, comprises:
a restructuring system configured to generate the restructured content based on the relevance metric.

Example 9 is the computing system of any or all previous examples wherein the content generating application that generates the first document comprises a word processing application and wherein the summary generator logic is configured to generate word processing content for the first document based on the restructured content.

Example 10 is a computer implemented method, comprising:
running, with a processor, a first content generation application to generate a first document; and
identifying, with identifying logic, a graphical object in slide presentation content in a source slide presentation document, generated using a slide presentation application, different from the first content generation application, for ingestion into the first document;
identifying metadata corresponding to the graphical object, on a slide in the slide presentation content;
identifying label information in the metadata corresponding to the graphical object; and
automatically restructuring the graphical object in the slide presentation content, based on the label information in the corresponding metadata, into restructured content that is displayed, by the first content generation application, in the first document.

Example 11 is the computer implemented method of any or all previous examples wherein automatically restructuring the graphical object comprises:

generating a textual summary corresponding to the graphical object based on the label information.

Example 12 is the computer implemented method of any or all previous examples wherein the graphical object comprises a graphical text object and wherein automatically restructuring the graphical object comprises:

restructuring the graphical text object by generating a reformatted representation of the graphical text object.

Example 13 is the computer implemented method of any or all previous examples and further comprising:

identifying different slides and a slide sequence in the slide presentation content; and identifying an order for information in the restructured content based on the slide presentation content on the different slides and based on the slide sequence.

Example 14 is the computer implemented method of any or all previous examples and further comprising:

identifying types of transitions between the different slides; and generating textual transitions in the restructured content based on the identified transitions.

Example 15 is the computer implemented method of any or all previous examples and further comprising:

generating, as metadata for the first document, a link to the slide presentation content in the source slide presentation document; and refreshing the restructured content, using the link to the slide presentation content, based on changes to the slide presentation content in the source slide presentation document.

Example 16 is the computer implemented method of any or all previous examples wherein automatically restructuring comprises:

generating a relevance metric indicative of a relevance of the data represented by the label information in the metadata to the first document; and generate the restructured content based on the relevance metric.

Example 17 is the computer implemented method of any or all previous examples wherein the content generating application that generates the first document comprises a word processing application and wherein generating the textual summary comprises:

generating word processing content for the first document based on the restructured content.

Example 18 is a computing system, comprising:

a processor;

content generating application logic that uses the processor to run a first content generation application to generate a first document;

graphic analysis logic configured to identify a graphical object, with corresponding metadata, on a slide in slide presentation content in a source slide presentation document, generated using a slide presentation application, different from the first content generation application;

metadata analysis logic configured to identify label information in the metadata corresponding to the graphical object; and a restructuring system that automatically restructures the graphical object in the slide presentation content into restructured content that is displayed, by the first content generation application, in the first document.

Example 19 is the computing system of any or all previous examples wherein the graphical object comprises a graphical text object and wherein the restructuring system comprises:

summary generator logic configured restructure the graphical text object by generating a reformatted representation of the graphical text object.

Example 20 is the computing system of any or all previous examples and further comprising:

slide presentation parsing logic configured to identify different slides and a slide sequence in the slide presentation content;

sequence analysis logic configured to generate an order for information in the restructured content based on the slide presentation content on the different slides and based on the slide sequence; transition identifier logic configured to identify types of transitions between the different slides; and transition analysis logic configured to generate textual transitions in the restructured content based on the identified transitions.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
a processor; and
memory storing instructions executable by the processor, wherein the instructions, when executed, cause the computing system to:
generate a first document by a first content generation application;
instruct a display device to display an application user interface that includes the first document;
receive a selection input that selects a source slide presentation document corresponding to a slide presentation application different from the first content generation application, the source slide presentation document comprising a set of slides, having slide presentation content, in a slide sequence;
identify a graphical object in the slide presentation content;
parse the slide presentation content to identify a first portion of the graphical object and a second portion of the graphical object;
automatically identify a data correlation between the first portion and the second portion of the graphical object;
generate an insight based on the data correlation between the first portion and the second portion of the graphical object;
add the generated insight to the first document in the application user interface;
identify a type of transition between the set of slides; and
generate a textual transition in the first document based on the identified type of transition.

2. The computing system of claim 1 wherein the instructions cause the computing system to:
identify the graphical object, with corresponding metadata, on a slide in the set of slides;
identify label information in the metadata corresponding to the graphical object; and
generate a textual summary corresponding to the graphical object based on the label information.

3. The computing system of claim 2 wherein the instructions cause the computing system to:

generate a relevance metric indicative of a relevance of the data represented by the label information in the metadata to second information in the first document;

restructure the slide presentation content, into restructured content, based on the relevance metric; and add the restructured content to the first document.

4. The computing system of claim 1 wherein the data correlation represents a pattern in the first and second portions of the graphical object.

5. The computing system of claim 1 wherein the slide presentation content comprises a graphical text object and wherein the instructions cause the computing system to restructure the graphical text object by generating a reformatted representation of the graphical text object, and to add the reformatted representation of the graphical text object to the first document.

6. The computing system of claim 1, wherein instructions cause the computing system to:

generate, as metadata for the first document, a link to the slide presentation content in the source slide presentation document; and use the link to the slide presentation content to refresh the first document based on changes to the slide presentation content in the source slide presentation document.

7. The computing system of claim 1, wherein the instructions configure the computing system to:

restructure the slide presentation content, into restructured content, based on at least one of:

a recipient associated with the first document; or a prior content restructuring performed by a user; and add the restructured content to the first document.

8. The computing system of claim 1, wherein the content generating application that generates the first document comprises a word processing application and wherein the instructions cause the computing system to:

generate word processing content for the first document based on the slide presentation content.

9. A computer implemented method, comprising:

generating a first document by a first content generation application;

instructing a display device to display an application user interface that includes the first document;

receiving a selection input that selects a source slide presentation document corresponding to a slide presentation application different from the first content generation application, the source slide presentation document comprising a set of slides, having slide presentation content, in a slide sequence;

identifying a graphical object in the slide presentation content;

parsing the slide presentation content to identify a first portion of the graphical object and a second portion of the graphical object;

automatically identifying a data correlation between the first portion and the second portion of the graphical object;

generating an insight based on the data correlation between the first portion and the second portion of the graphical object;

adding the generated insight to the first document in the application user interface;

identifying a type of transition between the set of slides; and generating a textual transition in the first document based on the identified type of transition.

10. The computer implemented method of claim 9 and further comprising:

identifying the graphical object, with corresponding metadata, on a slide in the set of slides;

identifying label information in the metadata corresponding to the graphical object; and generating a textual summary from the slide presentation content based on the label information.

11. The computer implemented method of claim 10, and further comprising:

generating a relevance metric indicative of a relevance of the data represented by the label information in the metadata to the first document; and restructuring the slide presentation content, into restructured content, based on the relevance metric; and adding the restructured content to the first document.

12. The computer implemented method of claim 10 wherein the content generating application that generates the first document comprises a word processing application and wherein generating the textual summary comprises:

generating word processing content for the first document based on the slide presentation content.

13. The computer implemented method of claim 9 wherein the slide presentation content comprises a graphical text object and further comprising:

generating a reformatted representation of the graphical text object; and adding the reformatted representation of the graphical text object to the first document.

14. The computer implemented method of claim 9 and further comprising:

restructuring the slide presentation content based on at least one of:

a recipient associated with the first document; or a prior content restructuring performed by a user; and adding the restructured content to the first document.

15. The computer implemented method of claim 9 and further comprising:

generating, as metadata for the first document, a link to the graphical object in the source slide presentation document; and refreshing the first document, using the link to the graphical object, based on a change to the graphical object in the source slide presentation document.

16. The computer implemented method of claim 9, wherein the data correlation represents a pattern in the first and second portions of the graphical object.

* * * * *